(12) United States Patent
Wu et al.

(10) Patent No.: US 12,526,784 B2
(45) Date of Patent: Jan. 13, 2026

(54) SCRAMBLING SIDELINK CONTROL INFORMATION IN SIDELINK COMMUNICATION

(71) Applicant: QUALCOMM Incorporated, San Diego, CA (US)

(72) Inventors: Shuanshuan Wu, San Diego, CA (US); Anantharaman Balasubramanian, San Diego, CA (US); Junyi Li, Fairless Hills, PA (US); Hong Cheng, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/643,122

(22) Filed: Dec. 7, 2021

(65) Prior Publication Data

US 2023/0180206 A1    Jun. 8, 2023

(51) Int. Cl.
*H04W 72/044* (2023.01)
*H04L 1/00* (2006.01)
*H04W 72/20* (2023.01)

(52) U.S. Cl.
CPC ....... *H04W 72/0466* (2013.01); *H04L 1/0061* (2013.01); *H04W 72/20* (2023.01)

(58) Field of Classification Search
CPC .............. H04W 72/0466; H04W 72/20; H04L 1/0061; H04L 1/0041; H04L 1/0045; H04L 1/18; H04L 5/0053; H04L 25/03866
See application file for complete search history.

(56) References Cited

U.S. PATENT DOCUMENTS

| 2019/0044669 A1* | 2/2019 | Davydov | H04L 5/005 |
| 2020/0084783 A1* | 3/2020 | Li | H04L 5/0033 |

(Continued)

FOREIGN PATENT DOCUMENTS

EP    3836730 A1    6/2021

OTHER PUBLICATIONS

CAICT: "Considerations on Scrambling Issue for NR V2X Unicast Sidelink", 3GPP TSG RAN WG1 Meeting #96, R1-1902923, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, 5 Pages, XP051600621, Sections 2.1, 2.2.

(Continued)

*Primary Examiner* — Ricky Q Ngo
*Assistant Examiner* — Kabir U Jahangir
(74) *Attorney, Agent, or Firm* — Procopio, Cory, Hargreaves & Savitch LLP

(57) ABSTRACT

Apparatus, methods, and computer-readable media for facilitating scrambling of sidelink control information for sidelink communication are disclosed herein. The scrambling of the SCI may include scrambling CRC, scrambling information bits, and/or scrambling channel bits. An example method for wireless communication at a user equipment UE includes scrambling at least a portion of SCI. The example method also includes transmitting the SCI carrying control information for a sidelink transmission. In another aspect, an example method for wireless communication at a UE includes receiving SCI having scrambled bits. The example method also includes decoding the SCI based on information known to the UE.

30 Claims, 11 Drawing Sheets

(56) References Cited

U.S. PATENT DOCUMENTS

| | | | |
|---|---|---|---|
| 2020/0351883 A1* | 11/2020 | Wu | H04W 72/0453 |
| 2021/0068101 A1* | 3/2021 | Chen | H04L 1/0072 |
| 2021/0075538 A1* | 3/2021 | Noh | H04L 1/0057 |
| 2021/0160844 A1* | 5/2021 | Lin | H04W 72/20 |
| 2021/0218511 A1* | 7/2021 | Zhang | H04L 5/0048 |
| 2022/0014331 A1* | 1/2022 | Peng | H04W 72/20 |
| 2022/0070869 A1* | 3/2022 | Wang | H04L 5/0044 |
| 2022/0167308 A1* | 5/2022 | Li | H04W 72/20 |
| 2022/0225292 A1* | 7/2022 | Mohammad Soleymani | H04W 72/20 |
| 2022/0353846 A1* | 11/2022 | Wang | H04W 72/0446 |
| 2023/0064256 A1* | 3/2023 | Ryu | H04W 72/02 |
| 2023/0111483 A1* | 4/2023 | Hong | H04L 5/0044 705/329 |
| 2023/0239899 A1* | 7/2023 | Ye | H04L 1/1864 370/329 |
| 2023/0247557 A1* | 8/2023 | Zhao | H04W 72/25 370/311 |
| 2024/0172251 A1* | 5/2024 | Hong | H04W 4/40 |
| 2025/0015922 A1* | 1/2025 | Kim | H04L 1/0041 |

OTHER PUBLICATIONS

International Search Report and Written Opinion—PCT/US2022/048738—ISA/EPO—Feb. 10, 2023.

Mediatek Inc: "On Sidelink Physical Layer Structure", 3GPP TSG RAN WG1 Ad-Hoc Meeting 1901, R1-1900196, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, 10 Pages, XP051593120, Section 4.

3GPP: "3rd Generation Partnership Project, Technical Specification Group Radio Access Network, NR, Multiplexing and Channel Coding (Release 16)", 3GPP TS 38.212, V16.7.0, Sep. 2021, 148 Pages, Section 8.4.1.1, 8.3.1.1.

3GPP: "3rd Generation Partnership Project, Technical Specification Group Radio Access Network, NR, Physical Channels and Modulation (Release 16)", 3GPP TS 38.211, V16.7.0, Sep. 2021, 129 Pages, Section 8.3.1.1.

* cited by examiner

| 502 | 504 |
|---|---|
| Priority | 3 bits |
| FDRA | bits depending on # of slot reservations and # subchannels |
| TDRA | 5 or 9 bits for 2 or 3 reservations |
| Resource reservation period | bits depending on # allowed periods |
| DM-RS pattern | bits depending on # configured patterns |
| SCI 2 format | 2 bits |
| Beta offset for SCI 2 rate matching | 2 bits |
| DM-RS port | 1 bit indicating one or two data layers |
| MCS | 5 bits |
| Additional MCS table | 0-2 bits |
| PSFCH overhead indicator | 0 or 1 bit |
| Reserved bits | bits up to upper layer |

FIG. 5A

| 552 | 554 |
|---|---|
| HARQ ID | bits depending on # HARQ process |
| NDI | 1 bit |
| RV-ID | 2 bits |
| Source ID | 8 bits |
| Destination ID | 16 bits |
| HARQ enable/disable | 1 bit |
| Cast type (broadcast, groupcast, unicast) | 2 bits |
| CSI request | 1 bit |

FIG. 5B

SCRAMBLING SIDELINK CONTROL INFORMATION IN SIDELINK COMMUNICATION

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus may scramble at least a portion of sidelink control information (SCI). The example apparatus may also transmit the SCI carrying control information for a sidelink transmission.

In another aspect of the disclosure, a method, a computer-readable medium, and an apparatus are provided for wireless communication at a UE. An example apparatus may receive SCI having scrambled bits. The example apparatus may also decode the SCI based on information known to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates an example table including a first column indicating information that may be included in first-stage SCI and a second column indicating a quantity of bits that may be associated with respective information, in accordance with aspects presented herein.

FIG. 5B illustrates an example table including a first column indicating information that may be included in the second-stage SCI and a second column indicating a quantity of bits that may be associated with the respective information, in accordance with aspects presented herein.

DETAILED DESCRIPTION

Figure 1:
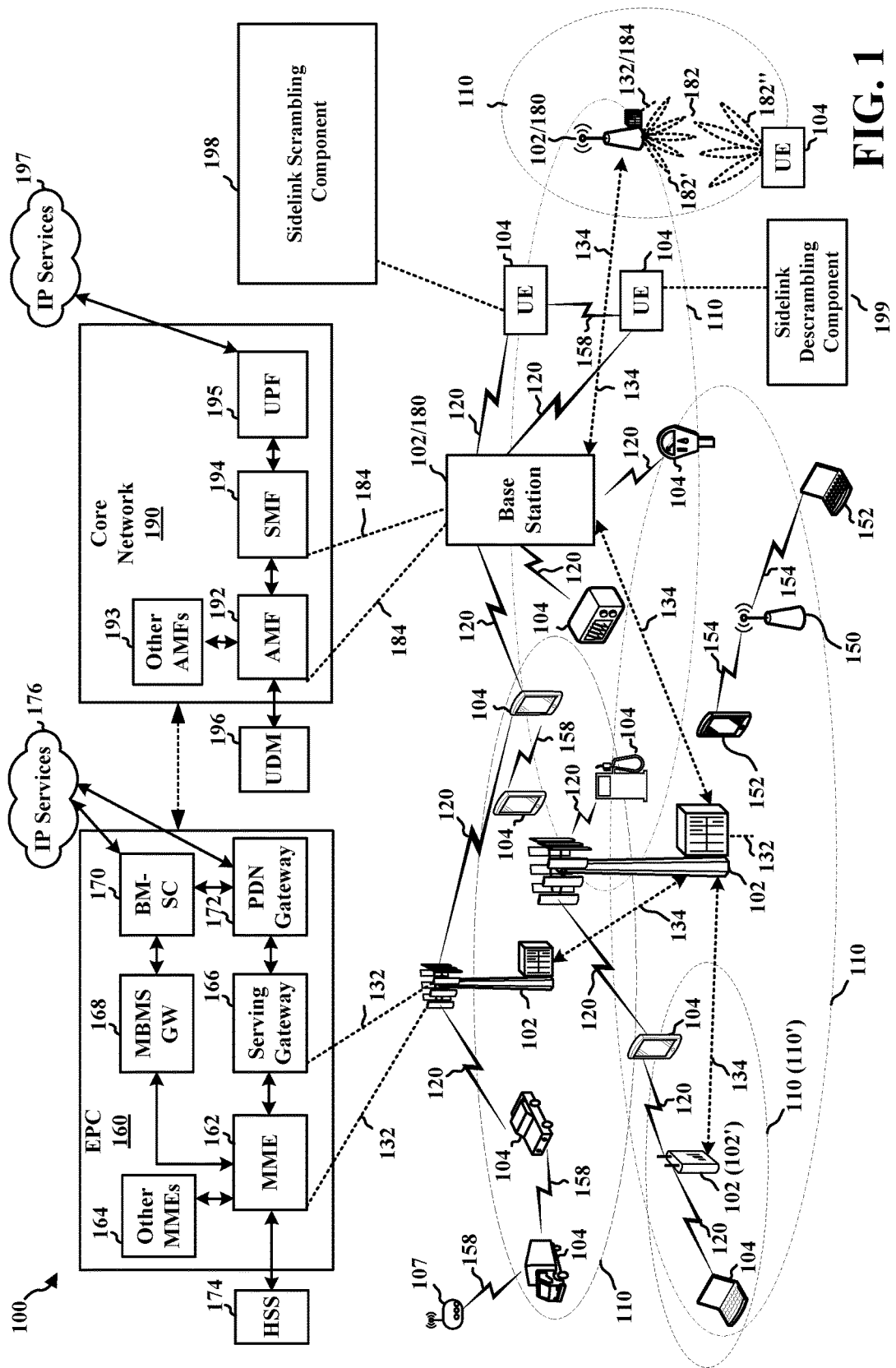
FIG. 1 is a diagram illustrating an example of a wireless communications system and an access network.

In sidelink, data may be organized in transport blocks. Each transport block may have an associated sidelink control information (SCI) message that is carried in the physical sidelink control channel (PSCCH). The SCI message may include information used for the correct reception of the transport block, such as an indication of the resource blocks occupied by the transport block, the modulation and coding scheme (MCS) used for the transport block, the priority of the message that is being transmitted, an indication of whether the transmission is a first transmission or a retransmission of the transport block, and/or the resource reservation interval.

The SCI of a sidelink communication may be communicated in a broadcast manner. For example, a UE that has sidelink capabilities may be able to decode the SCI. Thus, UEs that are the target UE as well as UEs that are unintended recipients of a sidelink communication may have the ability to decode the SCI. However, with the increase in diverse applications that may support sidelink communication it may be helpful to enable security that limits sidelink communication from being decoded by unintended receivers. As used herein, the term "security" refers to a mechanism for information to be communicated and decoded by the intended target. In some examples, security may be applied to directly exposed fields in SCI. In some examples, it may be beneficial to expose certain fields (e.g., that can be received by various receivers) while hiding or securing other fields with a security mechanism that limits decoding by unintended receivers.

For example, it may be beneficial to expose resource reservation information to UEs that have the ability to perform sidelink communication. A receiving UE may use the resource reservation information to determine whether resources are reserved or available, and to select a resource from the available resources for the UE's own sidelink communication. Thus, it may be beneficial to "expose" the resource reservation information to nearby UEs beyond the UE to which the communication is directed. For example, an unintended receiver may use the resource reservation information in the SCI to avoid using the same resources, which may reduce interference to the target UE. In some examples, "exposing" information may include communicating the information in a broadcast manner in which any UE with the ability to perform sidelink is able to decode the information.

However, there may be security issues with certain fields being directly exposed. For example, with respect to lower layer security, the UE identifiers (e.g., a source ID and a destination ID) may each be decoded by a receiving UE. Such directly exposed identifiers may become a security concern or an opportunity for misbehavior.

Aspects disclosed herein provide techniques that allow for security for the SCI and/or the corresponding physical sidelink shared channel (PSSCH) by enabled intended receivers to decode the SCI. Such disclosed techniques may also limit unintended receivers from decoding at least a portion of the SCI and obtaining information about the corresponding PSSCH. For example, examples disclosed herein provide techniques for exposing first information in SCI in a broadcast manner (e.g., UEs that support sidelink are able to decode the first information), while second information in SCI may be decodable by the intended receiver and non-decodable by unintended receivers.

Aspects disclosed herein may be achieved by performing scrambling operations on the SCI. In some examples, disclosed techniques facilitate scrambling the cyclic redundancy check (CRC) bits appended to a payload. In some examples, disclosed techniques facilitate scrambling the information bits (e.g., the payload prior to adding the CRC bits and performing channel encoding). In some examples, disclosed techniques facilitate scrambling the channel bits (e.g., the bits after performing rate matching and channel encoding). The example techniques disclosed herein limit the ability of unintended recipients (e.g., malicious UEs) of a sidelink communication to use information from the sidelink communication in a manner that presents a security concern or an opportunity for misbehavior.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a device configured to communicate using sidelink, such as a UE 104, may be configured to manage one or more aspects of wireless communication by facilitating scrambling operations for sidelink communication. For example, the UE 104 may include a sidelink scrambling component 198 configured to scramble at least a portion of SCI. The example sidelink scrambling component 198 may also be configured to transmit the SCI carrying control information for a sidelink transmission.

In another configuration, the UE 104 may be configured to manage or more aspects of wireless communication by facilitating descrambling operations for sidelink communication. For example, the UE 104 may include a sidelink descrambling component 199 configured to receive an SCI having scrambled bits. The example sidelink descrambling component 199 may also be configured to decode the SCI based on information known to the UE.

The aspects presented herein may enable sidelink-capable UEs to obfuscate certain information when communication using sidelink, which may facilitate improving communication performance, for example, by improving security.

Although the following description provides examples directed to 5G NR (and, in particular, to sidelink communication), the concepts described herein may be applicable to other similar areas, such as LTE, LTE-A, CDMA, GSM, and/or other wireless technologies, in which a UE may communicate directly with another UE (e.g., without communicating through a base station).

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
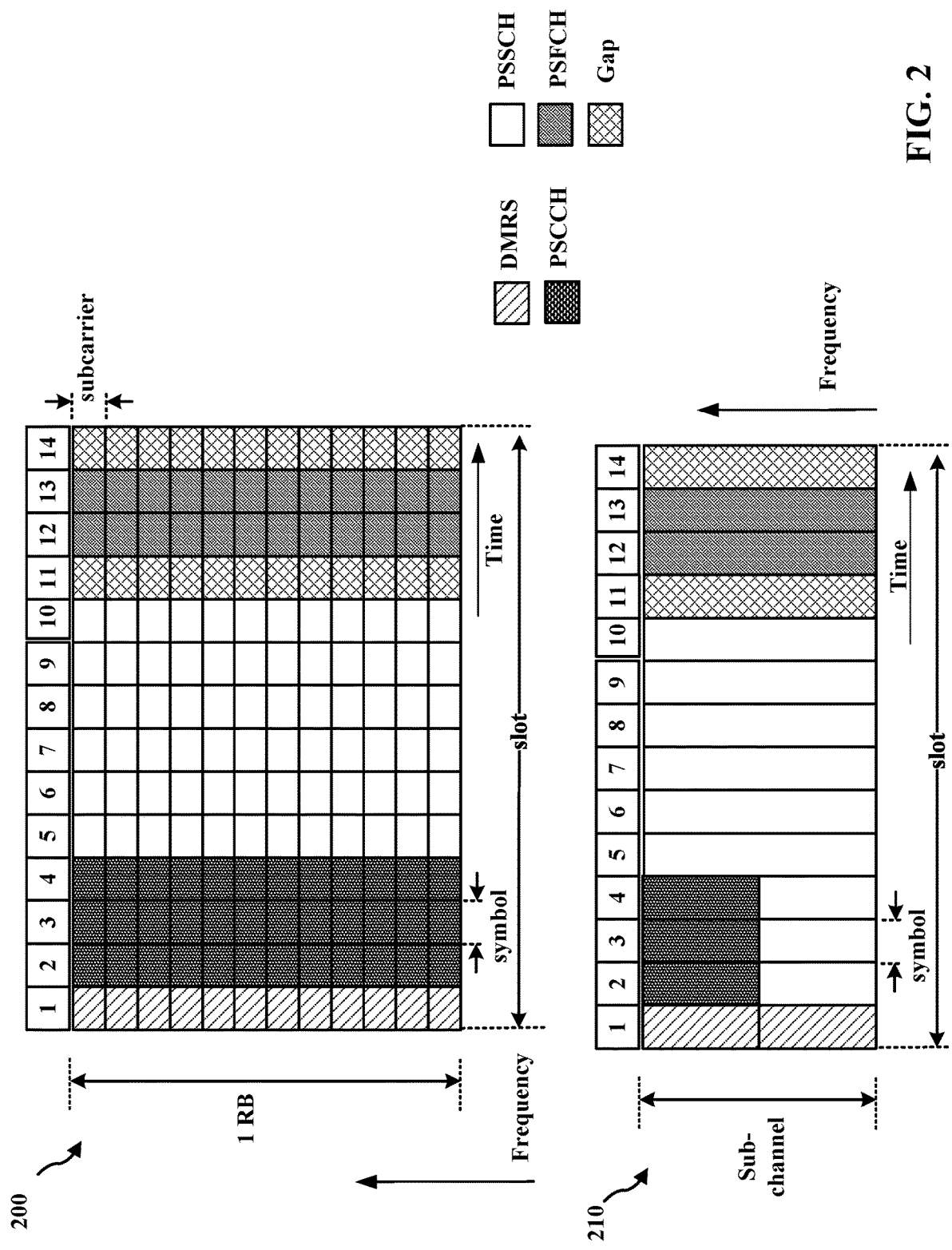
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
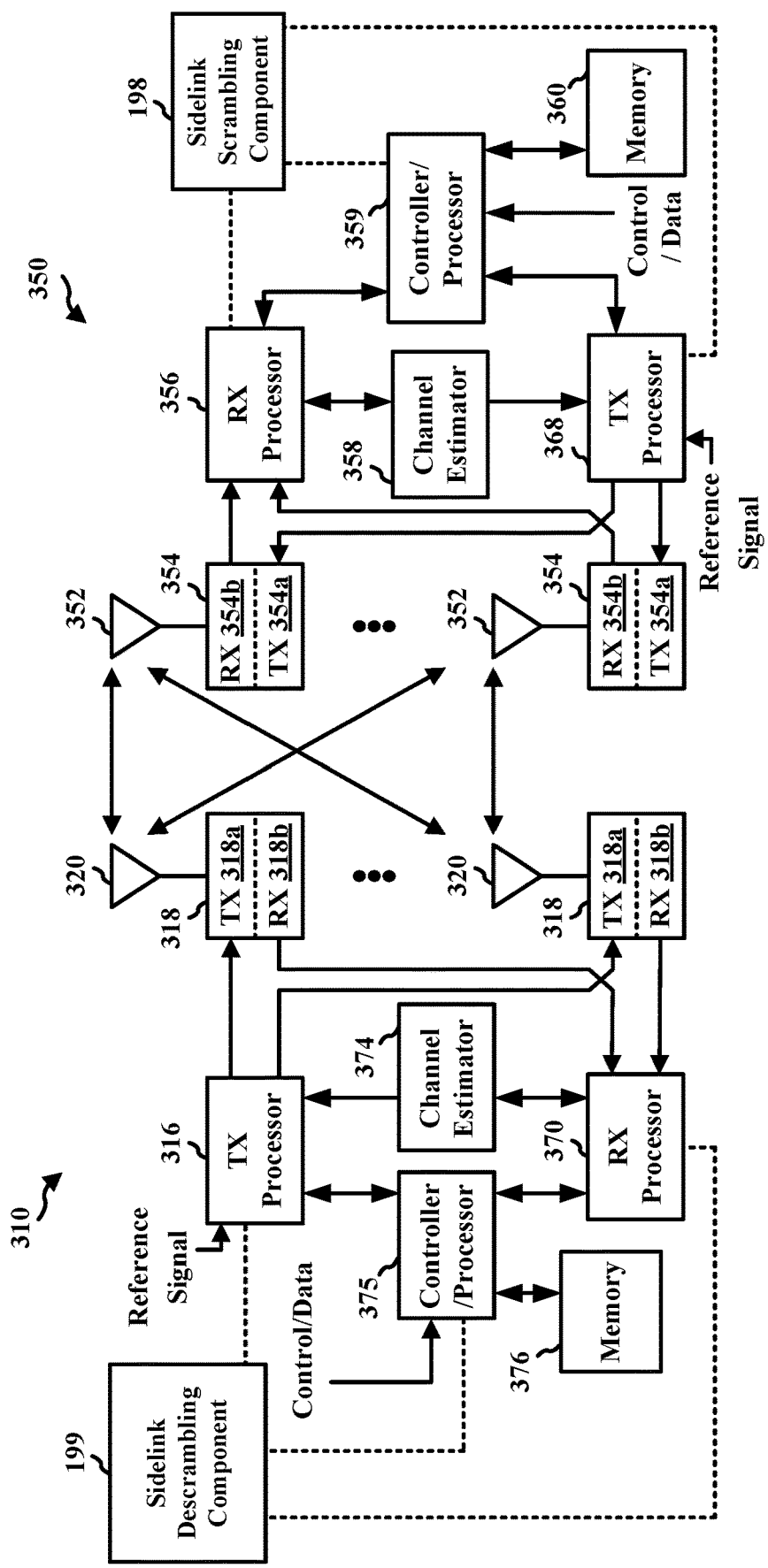
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations. Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354*a*. Each transmitter 354*a* may modulate an RF carrier with a respective spatial stream for transmission.

The transmission is processed at the first wireless communication device 310 in a manner similar to that described in connection with the receiver function at the second wireless communication device 350. Each receiver 318*b* receives a signal through its respective antenna 320. Each receiver 318*b* recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the SL scrambling component 198 of FIG. 1.

At least one of the TX processor 316, the RX processor 370, and the controller/processor 375 may be configured to perform aspects in connection with the SL descrambling component 199 of FIG. 1.

Figure 4:
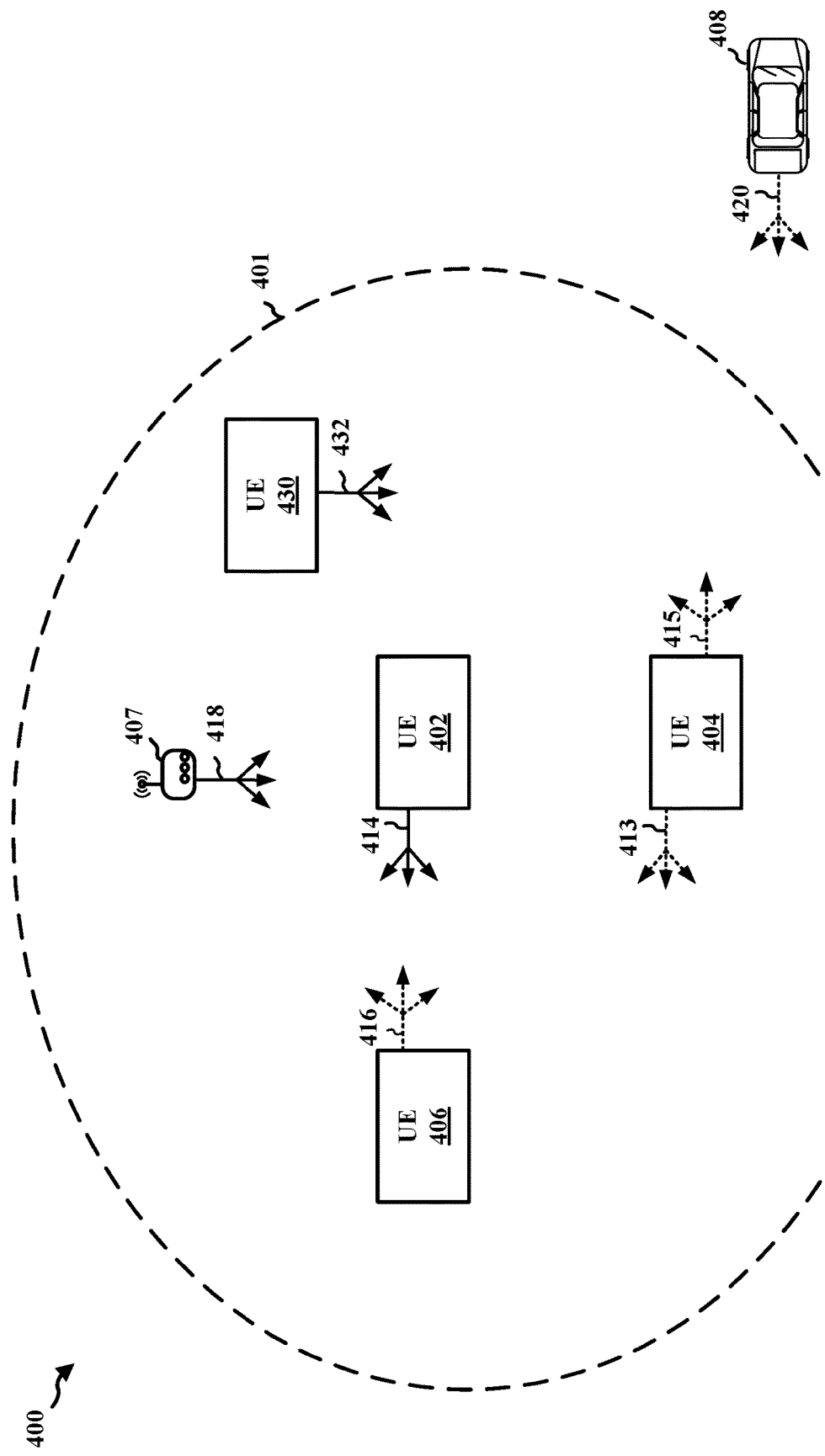
FIG. 4 illustrates example aspects of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 414, e.g., comprising a control channel (e.g., PSCCH) and/or a corresponding data channel (e.g., PSSCH), that may be received by a second UE 404, a third UE 406, and/or a fourth UE 408. The sidelink transmission 414 may be received directly from the first UE 402, e.g., without being transmitting through a base station. Additionally, or alternatively, an RSU 407 may receive communication from and/or transmit communication to the first UE 402, the second UE 404, the third UE 406, and/or the fourth UE 408. As shown in FIG. 4, the RSU 407 may transmit a sidelink transmission 418 that is received directly from the RSU 407.

The first UE 402, the second UE 404, the third UE 406, the fourth UE 408, and/or the RSU 407 may each be capable of operating as a transmitting device in addition to operating as a receiving device. Thus, the second UE 404 is illustrated as transmitting a second sidelink transmission 413 and a third sidelink transmission 415, the third UE 406 is illustrated as transmitting a fourth sidelink transmission 416, and the fourth UE 408 is illustrated as transmitting a fifth sidelink transmission 420. One or more of the transmissions may be broadcast or multicast to nearby devices. For example, the first UE 402 may transmit communication intended for receipt by other UEs within a range 401 of the first UE 402. In other examples, one or more of the transmissions may be groupcast to nearby devices that are a member of a group. In other examples, one or more of the transmissions may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

One or more of the first UE 402, the second UE 404, the third UE 406, the fourth UE 408, and/or the RSU 407 may include a SL scrambling component, similar to the SL scrambling component 198 described in connection with FIG. 1. One or more of the first UE 402, the second UE 404, the third UE 406, the fourth UE 408, and/or the RSU 407 may additionally or alternatively include a SL descrambling component, similar to the SL descrambling component 199 described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In sidelink, data may be organized in transport blocks. Each transport block may have an associated SCI message that is carried in the PSCCH. The SCI message may include information used for the correct reception of the transport block, such as in indication of the resource blocks occupied by the transport block, the modulation and coding scheme (MCS) used for the transport block, the priority of the message that is being transmitted, an indication of whether the transmission is a first transmission or a retransmission of the transport block, and/or the resource reservation interval.

In some examples, the SCI may be carried in two stages, e.g., a first-stage SCI ("SCI-1") that is transmitted in PSCCH and a second-stage SCI ("SCI-2") that is transmitted in a corresponding PSSCH. An example of resources for a PSCCH and PSSCH are illustrated in FIG. 2. The two stages of the SCI enables a flexible SCI design to support unicast, groupcast, and broadcast transmissions. Moreover, splitting the SCI in two stages allows other UEs that are not the target UE (sometimes referred to as a "intended recipient" herein) of a transmission to decode the SCI-1 for channel sensing purposes, e.g., for determining the resources reserved by other transmissions. The SCI-2 may then provide additional control information to a target UE for correctly receiving a transmission.

In sidelink, devices may be associated with a layer 1 source ID, a layer 2 source ID, a layer 1 destination ID, and a layer 2 destination ID. The layer 1 source ID may be the 8 least significant bits (LSB) of the layer 2 source ID. The layer 1 destination ID may be the 16 LSB of the layer 2 destination ID. The layer 1 source ID and the layer 1 destination ID may be included in the SCI-2. The layer 2 source ID may be self-assigned. For example, each device may determine its layer 2 source ID. The layer 2 destination ID may be based on a cast-types (e.g., unicast, groupcast, and broadcast transmissions). For unicast, the layer 2 destination ID for a first UE may be the layer 2 source ID of a peer UE. For example, the first UE and the peer UE may exchange their layer 2 source IDs, which become their respective layer 2 destination IDs. For groupcast, the layer 2 destination ID for the first UE may be mapped from a group identifier. For example, UEs in the same group may share the same layer 2 destination ID. For broadcast, the layer 2 destination ID may be mapped from sidelink service types and/or may be application-related.

The layer 2 destination ID may be used to address sidelink transmissions to intended receivers (e.g., to the peer UE in unicast, to UEs in the same group (e.g., associated with a group ID) for groupcast, or to UEs running the same service type (e.g., a V2X service type) and/or application. Additionally, a UE may be participating in multiple sidelink communication sessions. For example, the first UE may be participating in one or more unicast sessions, may be participating in one or more groupcast sessions, and/or may be running one or more services and/or applications. Thus, it may be appreciated that the first UE may be associated with multiple destination IDs. In such examples, the first UE may monitor each of the destination IDs to receive sidelink transmissions.

In sidelink, each device that receives a sidelink communication may have the capability to decode the first-stage SCI. The PSCCH carries the SCI-1 that contains control information associated with a PSSCH and the SCI-2. FIG. 5A illustrates an example table 500 including a first column 502 indicating information that may be included in the first-stage SCI and a second column 504 indicating a quantity of bits that may be associated with respective information.

As shown in FIG. 5A, the first-stage SCI indicates the frequency resources (e.g., sub-channels) of the PSSCH carrying the current transmission of a transport block (e.g., a "FDRA" field), as well as the resource reservation for up to two further retransmissions of the transport block (e.g., a "TDRA" field). The first-stage SCI also indicates about the resources reservation period for PSSCH (e.g., a "resource reservation period" field). In addition, the first-stage SCI includes a priority of the associated PSSCH (e.g., a "priority" field) and the format and size of the second-stage SCI (e.g., a "SCI 2 format" field). The first-stage SCI also indicates the MCS of the data payload carried in the associated PSSCH (e.g., an "MCS" field). The MCS may be determined with an MCS index indicated within an MCS table (e.g., an "Additional MCS table" field). Within a resource pool, multiple time patterns can be configured (or preconfigured) for the PSSCH DMRS, and the first-stage SCI indicates which time pattern is used for the associated PSSCH (e.g., a "Beta offset for SCI 2 rate matching" field). The first-stage SCI also provides the number of ports of the PSSCH DMRS (e.g., a "DM-RS port" field).

The PSSCH carries the second-stage SCI and the data payload including the transport block. The second-stage SCI carries information used for decoding PSSCH and for supporting HARQ feedback and CSI reporting. FIG. 5B illustrates an example table 550 including a first column 552 indicating information that may be included in the second-stage SCI and a second column 554 indicating a quantity of bits that may be associated with the respective information.

As shown in FIG. 5B, the second-stage SCI indicates the layer 1 source ID (e.g., a "Source ID" field) and the layer 1 destination ID (e.g., a "Destination ID" field) of a transmission that represent identifiers, in the physical layer, of the transmitting UE and the target UEs (e.g., the intended recipients). The layer 1 source ID allows a recipient UE to know the identity of the transmitting UE, which may be used for HARQ feedback. The second-stage SCI also carries a one-bit new data indicator (e.g., an "NDP" field) that is used to specify whether the transport block sent in the PSSCH corresponds to the transmission of new data or a retransmission. Additionally, a HARQ process ID is also included in the second-stage SCI in order to identify a transport (e.g., a "HARQ ID" field). The second-stage SCI also indicates about the redundancy version that depends on the index of a retransmission (e.g., an "RV-ID" field). Additionally, the second-stage SCI indicates whether HARQ feedback is enabled/disabled for the PSSCH (e.g., a "HARQ enable/disable" field). As shown in FIG. 5B, the second-stage SCI also indicates whether the PSSCH is being unicast, groupcast, or broadcast. The second-stage SCI also includes an indicator to request CSI feedback from a receiving UE (e.g., a "CSI request" field).

The two-stage SCI reduces the complexity of the SCI decoding at the target UE(s) and for sensing UEs that may decode the first-stage SCI to know which resources are reserved by the transmitting UE. The reduced complexity may be due to, for example, the first-stage SCI having a fixed size, the first-stage SCI being carried in PSCCH on a known possible location within a sub-channel, the first-stage SCI indicating the resources of the second-stage SCI carried in PSSCH, and/or the second-stage SCI having a varying payload size depending on the transmission type.

The SCI of a sidelink communication may be communicated in a broadcast manner. For example, a UE that has sidelink capabilities may be able to decode the SCI. Thus, UEs that are the target UE and UEs that unintended recipients of a sidelink communication may decode the SCI.

Figures 6A, 6B:
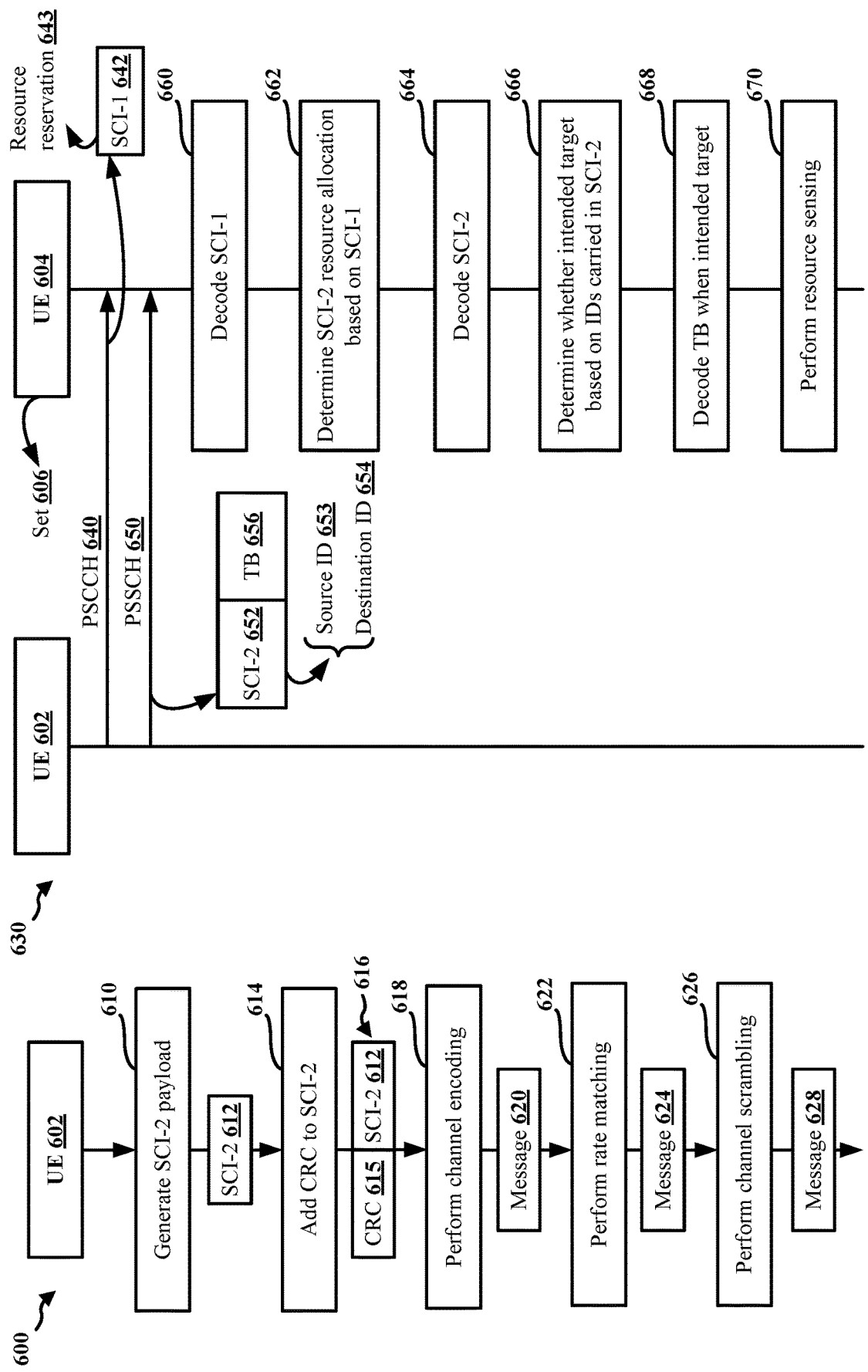
FIG. 6A illustrates an example of stages that a transmitting UE may perform when transmitting a sidelink communication including second-stage SCI payload, in accordance with aspects presented herein.
FIG. 6B illustrates an example communication flow between a transmitting UE and a receiving UE, in accordance with aspects presented herein.

FIG. 6A illustrates an example of stages 600 that a transmitting UE 602 may perform when transmitting a sidelink communication including a second-stage SCI payload, as presented herein. The example stages 600 of FIG. 6A may be applied to a UE transmitting additional or alternative payloads, such as a first-stage SCI and/or a transport block.

At 610, the transmitting UE 602 generates a second-stage SCI payload 612. In some examples, the payload may be referred to herein as "information bits" and contain the data being transmitted to a receiving UE.

At 614, the transmitting UE 602 generates a message 616 by adding CRC bits 615 to the second-stage SCI payload 612. The transmitting UE 602 may add the CRC bits 615 to allow error detection at a receiving UE. In some examples, the CRC bits 615 may include 24 parity bits.

At 618, the transmitting UE 602 performs channel encoding on the message 616 to generate a message 620. In some examples, performing channel encoding may include encoding the message 616 with a Polar code. The channel coding may be applied to generate redundancy and increase resilience to the radio propagation channel. However, other examples may include additional or alternate techniques for performing the channel encoding.

At 622, the transmitting UE 602 performs rate matching on the message 620 to generate a message 624. The rate matching may be applied to ensure that the number of bits correspond to the capability of physical channel.

At 626, the transmitting UE 602 may perform channel scrambling. For example, the transmitting UE 602 may apply a scrambling sequence to the bits of the message 624 to generate a scrambled message 628. Scrambling may use a pseudo-random sequence to "randomly" change some bits from "1" to "0" and other bits from "0" to "1." Thus, the scrambling may randomize the bit stream of the message 624. Examples of a scrambling sequence include the Gold sequence. However, other examples may use additional or alternate techniques when applies the scrambling sequence. In some examples, the scrambling (e.g., at 626) may be performed with a pre-defined seed (e.g., "1010"). Equation 1 below illustrates an example scramble sequence that may be used to scramble the message 624 (e.g., at 626).

$$c(n)=(x_1(n+N_c)+x_2(n+N_c)) \bmod 2 \quad \text{Equation 1:}$$

In Equation 1, the term "c(n)" represents the output sequence, and the term "$N_c$" is equal to 1600. The term "$x_1(n)$" represents a first m-sequence, and the term "$x_2(n)$" represents a second m-sequence. The first m-sequence and the second m-sequence may each be initiated by an initiator term (e.g., a value, a formula, etc.). For example, the second m-sequence $x_2$ (n) may be initiated by an initializer characterized in Equation 2 (below).

$$c_{init}=\Sigma_{i=0}^{30} x_2(i)*2^i \quad \text{Equation 2:}$$

In Equation 2, the value of the initializer may depend on the application of the sequence in Equation 1. For example, when scrambling sidelink, the scrambling sequence generator may be initialized based on Equation 3 (below).

$$c_{init}=2^{15}*N_{ID}+1010 \quad \text{Equation 3:}$$

In equation 3, the term "$N_{ID}$" may be defined by Equation 4 (below).

$$N_{ID}=N_{ID}^x \bmod 2^{16} \quad \text{Equation 4:}$$

In equation 4, the quantity "$N_{ID}^x$" equals the decimal representation of the CRC on the PSCCH associated with the PSSCH according to Equation 5 (below).

$$N_{ID}^X=\Sigma_{i=0}^{L-1} p_i*2^{L-1-i} \quad \text{Equation 5:}$$

In equation 5, the term "$p_i$" represents the parity bit of the CRC (e.g., added at 614). The term "L" represents the number of parity bits.

As shown in Equations 3, 4, and 5, the scrambling performed on the channel bits for second-stage SCI is performed with a pre-defined seed (e.g., "1010"). As a result, as long as a UE has the ability to perform sidelink communication, the UE may decode the second-stage SCI.

FIG. 6B illustrates an example communication flow 630 between the transmitting UE 602 and a receiving UE 604, as presented herein. In the illustrated example, the communication flow 630 facilitates the transmitting UE 602 transmitting sidelink to the receiving UE 604. Aspects of the transmitting UE 602 and/or the receiving UE 604 may be implemented by the UE 104 of FIG. 1 and/or the device 350 of FIG. 3. Although not shown in the illustrated example of FIG. 6B, it may be appreciated that in additional or alternative examples, the transmitting UE 602 and/or the receiving UE 604 may be in communication with one or more other base stations or UEs.

In the illustrated example of FIG. 6B, the transmitting UE 602 is transmitting a transport block 656 to the receiving UE 604. Each transport block is associated with an SCI. A transport block is carried in a PSSCH. The SCI indicates the resources used by the PSSCH that carries the associated transport block, as well as further information for decoding the transport block. A PSCCH is sent with a PSSCH, as shown in the example of FIG. 2.

In the illustrated example of FIG. 6B, the SCI is transmitted in two stages. For example, the transmitting UE 602 transmits PSCCH 640 that is received by the receiving UE 604. The PSCCH 640 carries first-stage SCI 642, such as the example first-stage SCI of FIG. 5A. The transmitting UE 602 also transmits PSSCH 650 that is received by the receiving UE 604. The PSSCH 650 includes second-stage SCI 652, such as the example second-stage SCI of FIG. 5B, and a transport block 656.

The first-stage SCI 642 includes control information associated with a PSSCH (e.g., the PSSCH 650) and the second-stage SCI (e.g., the second-stage SCI 652). The second-stage SCI 652 carries information for decoding the PSSCH 650.

As shown in FIG. 6B, the receiving UE 604 decodes, at 660, the first-stage SCI 642. The size of the first-stage SCI 642 may be fixed within a resource pool. Additionally, since the resource pool may be sued for any transmission type (e.g., unicast, groupcast, or broadcast), the payload size of the first-stage SCI 642 is the same for unicast transmissions, groupcast transmissions, and broadcast transmission within the resource pool. With L sub-channels within a resource pool, there are L possible locations for a PSCCH in a slot. Accordingly, to receive the first-stage SCI 642, the receiving UE 604 may check the L possible PSCCH locations at each slot within the resource pool.

After decoding the first-stage SCI 642 (e.g., at 660), the receiving UE 604 obtains the information to decode the second-stage SCI 652 carried in the PSSCH 650, at 662. For example, the first-stage SCI 642 may indicate the resource allocation for the second-stage SCI 652 and the format of the second-stage SCI 652. Thus, the receiving UE 604 may avoid performing blind decoding of the second-stage SCI 652.

As shown in FIG. 6B, the receiving UE 604 decodes, at 664, the second-stage SCI 664. In some examples, the receiving UE 604 may use DM-RS to facilitate decoding the second-stage SCI 652. After decoding the second-stage SCI 652, the receiving UE 604 may determine whether the receiving UE 604 is the intended target based on identifiers (IDs) carried in the second-stage SCI 652. For example, the second-stage SCI 652 may include a source ID 653 and a destination ID 654. The source ID 653 may indicate the source of the sidelink communication (e.g., an identifier associated with the transmitting UE 602). The destination ID 654 may indicate the intended target of the sidelink communication. The receiving UE 604 may use the destination ID 654 to determine whether the receiving UE 604 is the intended target of the sidelink communication.

The destination ID 654 may be the same as an identifier of the receiving UE 604 when the receiving UE 604 is the intended target of the sidelink communication. In some examples, the receiving UE 604 may be associated with a set 606 including one or more destination IDs. The set 606 may include one or more layer 1 destination IDs and/or one or more layer 2 destination IDs. The layer 1 destination IDs may be assigned by lower layer protocols. The layer 2 destination IDs may be assigned by higher layer protocols and/or by application(s).

In some examples, the receiving UE 604 may be included in a group for groupcast messages. For example, the group may be assigned a group identifier and the receiving UE 604 may be part of the group. In such examples, the set 606 may include the group identifier as an identifier associated with the receiving UE 604. For example, when the destination ID 654 includes the group identifier, the receiving UE 604 may determine, at 666, that the receiving UE 604 is the intended target of the sidelink communication. In such examples, the group identifier may be an example of a layer 1 destination ID that may be included in the second-stage SCI 652.

In some examples, the set 606 may include one or more layer 2 destination identifiers. For example, the transmitting UE 602 and the receiving UE 604 may exchange RRC signaling to provide functionalities to support sidelink unicast communications. The RRC functionalities may include exchanging access stratum (AS) level information to align the transmitting UE 602 and the receiving UE 604 to support sidelink unicast. The RRC functionalities may also include exchanging sidelink UE capability information to indicate features that each UE supports for each AS protocol. An RRC connection may be defined as a logical connection between a pair of layer 2 source and layer 2 destination IDs. A UE may have multiple unicast connections with one or more UEs for different pairs of layer 2 source and destination IDs. Thus, the receiving UE 604 may have different layer 2 IDs that correspond to layer 2 destination IDs.

Returning to the example communication flow 630 of FIG. 6B, if the receiving UE 604 determines that it is the intended target of the sidelink communication (e.g., based on the destination ID 654 and the one or more identifiers included in the set 606), the receiving UE 604 may, at 668, decode the transport block 656 received via the PSSCH 650.

The receiving UE 604 may also, at 670, perform resource sensing based on the sidelink communication. For example, the first-stage SCI 642 may include resource reservation information 643 by the transmitting UE 602. The receiving UE 604 may use the resource reservation information 643 to determine which resources are reserved by other UEs (e.g., the transmitting UE 602) and to determine which resources are available to the receiving UE 604 to use for a sidelink communication. The receiving UE 604 may perform the resource sensing (e.g., at 670) regardless of whether the receiving UE 604 is the intended target of the sidelink communication.

However, as described above, the receiving UE 604 has the ability to decode the first-stage SCI 642 and the second-stage SCI 652 regardless of whether the receiving UE 604 is the intended target of the sidelink communication from the transmitting UE 602. Additionally, with the increase in diverse applications that may support sidelink communication, security may become a concern if not addressed. As used herein, the term "security" refers to information being communicated and decoded by the intended target. In some examples, security may refer to directly exposed fields in SCI. However, it may be appreciated in some examples, it may be beneficial to expose certain fields while hiding other fields.

For example, it may be beneficial to expose resource reservation information to UEs that have the ability to perform sidelink communication. A receiving UE may use the resource reservation information to determine which resources are reserved or available, and to select a resource from the available resources for sidelink communication. Thus, it may beneficial to "expose" the resource reservation information. In some examples, "exposing" information may include communicating the information in a broadcast manner in which any UE with the ability to perform sidelink is able to decode the information.

However, there may be security issues with certain fields being directly exposed. For example, with respect to lower layer security, the identifiers are directly exposed in the SCI. For example, in the example of FIG. 6B, the second-stage SCI 652 includes the source ID 653 and the destination ID 654, which may each be decoded by the receiving UE 604. Such directly exposed identifiers may become a security concern or an opportunity for misbehavior.

For example, and referring again to the example 400 of FIG. 4, a malicious UE 430 may be positioned to receive sidelink communications from at least the first UE 402. As used herein, a malicious UE (sometimes referred to as an "illegal UE") is a non-intended target of a sidelink communication that may use information from the sidelink communication in a manner that presents a security concern or an opportunity for misbehavior. For example, the malicious UE 430 may receive the sidelink transmission 414 from the first UE 402 and intended for the second UE 404, and decode the source ID and the destination ID. The malicious UE 430 may then use a decoded identifier to do resource reservations "on behalf of" a legit UE (e.g., the first UE 402 and/or the second UE 404). For example, the malicious UE 430 may transmit a sidelink transmission 432 including the source ID of the first UE 402 with first-stage SCI including resource reservation information. In such examples, other UEs receiving the sidelink transmission 432 may incorrectly determine that the first UE 402 is reserving the resources indicated by the sidelink transmission 432, which may enable the malicious UE 430 to increase interference at certain resources. In other examples, the malicious UE 430 may set the decoded destination ID as its identifier and reserve resources "on behalf of" the second UE 404.

In another example, the malicious UE 430 may use the source ID of the sidelink transmission 414 and transmit HARQ feedback to the first UE 402. In such scenarios, the HARQ feedback may not be based on whether an intended successfully received a sidelink communication, but may increase interference at certain resources and/or cause the first UE 402 to incorrectly determine that sidelink communication was successfully received by the intended target.

Aspects disclosed herein provide techniques that allow for security for the SCI and/or the corresponding PSSCH by enabled intended receivers to decode the SCI. Such disclosed techniques may also limit unintended receivers from decoding the SCI and obtaining information about the corresponding PSSCH. For example, examples disclosed herein provide techniques for exposing first information in SCI in a broadcast manner (e.g., UEs that support sidelink are able to decode the first information), while second information in SCI may be decodable by the intended receiver and non-decodable by unintended receivers.

Aspects disclosed herein may be achieved by performing scrambling operations on the SCI. In some examples, disclosed techniques facilitate scrambling the CRC bits appended to a payload. In some examples, disclosed techniques facilitate scrambling the information bits (e.g., the payload prior to adding the CRC bits and performing channel encoding). In some examples, disclosed techniques facilitate scrambling the channel bits (e.g., the bits after performing rate matching and channel encoding). The example techniques disclosed herein limit the ability of unintended recipients (e.g., malicious UEs) of a sidelink communication to use information from the sidelink communication in a manner that presents a security concern or an opportunity for misbehavior.

Figure 7:
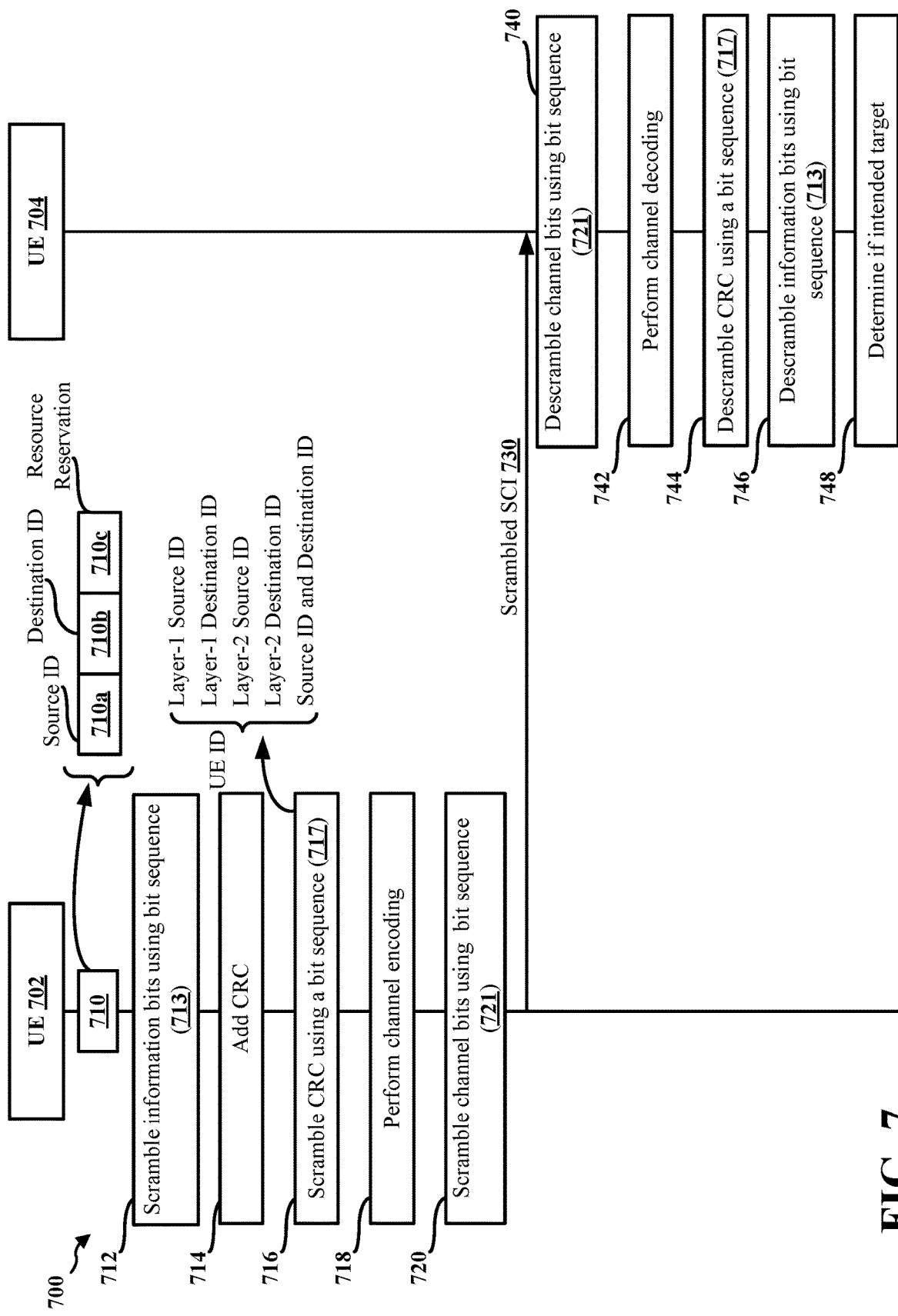
FIG. 7 illustrates an example communication flow between a first UE and a second UE transmitting sidelink communication, in accordance with aspects presented herein.

FIG. 7 illustrates an example communication flow 700 between a first UE 702 and a second UE 704, as presented herein. Aspects of the first UE 702 and/or the second UE 704 may be implemented by the UE 104 of FIG. 1, the device 350 of FIG. 3, the transmitting UE 602, and/or the receiving UE 604. Although not shown in the illustrated example of FIG. 7, it may be appreciated that in additional or alternative examples, the first UE 702 and/or the second UE 704 may be in communication with one or more other base stations or UEs.

In the illustrated example, the communication flow 700 facilitates the first UE 702 transmitting a sidelink communication that intended recipients are able to decode the SCI and/or the corresponding PSSCH. For example, the first UE 702 may generate an SCI payload 710 for transmitting to the second UE 704. In some examples, the SCI payload 710 may be part of a two-stage SCI. In such examples, the SCI payload 710 may include second-stage SCI, such as the example second-stage SCI 652 of FIG. 6B. For example, the SCI payload 710 may include one or more fields of the example second-stage SCI of FIG. 5B, such as a source identifier information 710a and a destination identifier information 710b.

In some examples, the SCI payload 710 may include a single-stage SCI. In such examples, the SCI payload 710 may include information included in first-stage SCI, such as the example first-stage SCI 642 of FIG. 6A, and information included in second-stage SCI, such as the example second-stage SCI 652 of FIG. 6B. For example, the SCI payload 710 may include one or more fields of the example second-stage SCI of FIG. 5B, such as the source identifier information 710a, and the destination identifier information 710b. The SCI payload 710 may also include one or more fields of the example first-stage SCI of FIG. 5A, such as resource reservation information 710c.

As described herein, the first UE 702 may then perform one or more techniques to scramble the SCI payload 710. As shown in FIG. 7, the first UE 702 transmits scrambled SCI information 730 that is received by the second UE 704. In examples in which the first UE 702 uses two-stage SCI, the scrambled SCI information 730 may include the second-stage SCI. In examples in which the first UE 702 uses single-stage SCI, the scrambled SCI information 730 may include the single-stage SCI. The second UE 704 receives the scrambled SCI information 730 and performs one or more techniques to descramble the scrambled SCI information 730. At 748, the first UE 702 may use the descrambled SCI to determine if the second UE 704 is the intended target of the sidelink communication.

In one example aspect, the techniques disclosed herein protect the second-stage SCI that carries the layer 1 identifiers. For example, the first UE 702 may scramble one or more aspects of the second-stage SCI so that the layer 1 source ID (e.g., the source identifier information 710a) and layer 1 destination ID (e.g., the destination identifier information 710b) are not exposed to unintended receivers.

In some examples, the first UE 702 may scramble the CRC bits added to the SCI payload 710. For example, and described in connection with 614 of FIG. 6A, the first UE 702 may add, at 714, a CRC to the SCI payload 710 to facilitate error detection at a receiving UE. At 716, the first UE 702 may use a bit sequence 717 to scramble the CRC bits. In some examples, the bit sequence 717 may include a UE ID. For example, the first UE 702 may use a source ID (e.g., a layer 1 source ID or a layer 2 source ID), may use a destination ID (e.g., a layer 1 destination or a layer 2 destination ID), or may use a source ID and a destination ID.

In some examples, the first UE 702 may use the destination ID to scramble the CRC bits as the receiving UE knows its own identifier and, thus, can use its identifier to perform descrambling of the CRC bits. In some examples, the first UE 702 may use the source ID to scramble the CRC bits (e.g., at 716) when an intended receiver is aware of the source ID. For example, after establishing an RRC connection with the second UE 704 (e.g., the facilitate sidelink unicast communication), the first UE 702 may determine to use a source ID to scramble the CRC bits (e.g., at 716).

In some examples, the CRC bits may include a first quantity of bits (e.g., 24 bits) and the UE ID may include a second quantity of bits that is less than the first quantity of bits. For example, the layer 1 source ID may include 8 bits while the layer 1 destination ID may include 16 bits. In such examples, the first UE 702 may use the UE ID to scramble the least significant bits (LSB) of the CRC, or may use the UE ID to scramble the most significant bits (MSB) of the CRC.

In some examples, the first UE 702 may receive the bit sequence 717 to use to scramble the CRC bits (e.g., at 716) from a base station. For example, in a centralized resource allocation mode (which may be referred to as "Mode 1"), a network entity, such as a base station, provides the resource allocation to a UE for sidelink communication. For example, and referring to the example of FIG. 1, a base station 102/180 may determine resources for sidelink communication and may allocate resources to different UEs (e.g., the first UE 702) to use for sidelink transmissions. In some such examples, the base station 102/180 may also provide a bit sequence 717 to the first UE 702 and the second UE 704.

In some examples, the first UE 702 and the second UE 704 may negotiate the bit sequence 717. For example, when the first UE 702 and the second UE 704 are configured to perform sidelink unicast communication, the first UE 702 and the second UE 704 may exchange the bit sequence 717 to facilitate sidelink communication while scrambling the CRC bits (e.g., at 716). In some examples, the first UE 702 and the second UE 704 may be configured to perform sidelink groupcast communication. In such examples, the first UE 702 and the second UE 704 may exchange the bit sequence 717 to facilitate sidelink communication while scrambling the CRC bits (e.g., at 716).

In examples in which the first UE 702 scrambles the CRC bits using the bit sequence 717, the scrambled SCI information 730 includes the SCI payload 710 and a scrambled CRC. In such examples, the second UE 704 may receive the scrambled SCI information 730 and, at 744, perform CRC descrambling. For example, the second UE 704 may apply the bit sequence 717 to descramble the CRC bits of the scrambled SCI information 730. In some examples, the bit sequence 717 may include a source ID, may include a destination ID, or may include a source ID and a destination ID. In some examples, the second UE 704 may be associated with multiple destination IDs. In such examples, the second UE 704 may apply each of the multiple destination IDs when descrambling the CRC (e.g., at 744). In some examples, the bit sequence 717 may include a sequence received from a base station. In some examples, the bit sequence 717 may include a sequence negotiated with the first UE 702, e.g., when the first UE 702 and the second UE 704 are configured for sidelink unicast communication and/or sidelink groupcast communication.

In some examples, the first UE 702 may scramble the channel bits by a sequence initialized by a bit sequence 721. For example, at 718, the first UE 702 may perform channel encoding, as described in connection with 618 and 622 of FIG. 6A. The first UE 702 may then perform channel scrambling, at 720, to "randomly" change some bits from "1" to "0" and other bits from "0" to "1" before transmission of the air-interface.

In some examples, the first UE 702 may use the bit sequence 721 to initialize a scrambling sequence. For example, in the example of FIG. 6A, the scrambling sequence is initiated using a pre-defined seed (e.g., "1010"). In the example of FIG. 7, the first UE 702 may use the bit sequence 721 to initialize the scrambling sequence. In some examples, the bit sequence 721 may include a UE ID, such as a layer 1 destination ID. In some examples, the bit sequence 721 may be derived from a UE ID (e.g., part of the UE ID). In some examples, the bit sequence 721 may be based on a UE ID and additional information, such as a slot index, a (pre-) configured parameter, etc. In some examples, the second UE 704 may be associated with multiple destination IDs. In such examples, the second UE 704 may apply each of the multiple destination IDs when descrambling the channel bits (e.g., at 740). In some examples, the bit sequence 721 may include a sequence received from a base station. In some examples, the bit sequence 721 may include a sequence negotiated with the first UE 702, e.g., when the first UE 702 and the second UE 704 are configured for sidelink unicast communication and/or sidelink groupcast communication.

Similar to the example of descrambling the CRC bits (e.g., at 744), the second UE 704 may receive the scrambled SCI information 730 and perform one or more descrambling techniques to recover the SCI payload 710. For example, at 740, the second UE 704 may perform channel bits descrambling on the scrambled SCI information 730 using the bit sequence 721. In some examples, the bit sequence 721 may include a UE ID, such as a layer 1 destination ID. In some examples, the bit sequence 721 may be derived from a UE ID (e.g., part of the UE ID). In some examples, the bit sequence 721 may be based on a UE ID and additional information, such as a slot index, a (pre-) configured parameter, etc. In some examples, the second UE 704 may be associated with multiple destination IDs. In such examples, the second UE 704 may apply each of the multiple destination IDs when descrambling the channel bits (e.g., at 740). In some examples, the bit sequence 721 may include a sequence received from a base station. In some examples, the bit sequence 721 may include a sequence negotiated with the first UE 702, e.g., when the first UE 702 and the second UE 704 are configured for sidelink unicast communication and/or sidelink groupcast communication. The second UE 704 may then perform channel decoding, at 742, and based on the descrambled SCI, determine, at 748, if the second UE 704 is the intended target of the sidelink communication.

In some examples, the first UE 702 may scramble the information bits of the SCI by a sequence initialized by a bit sequence 713. For example, at 712, the first UE 702 may perform information bit scrambling to "randomly" change some bits from "1" to "0" and other bits from "0" to "1" of the SCI payload 710 before adding the CRC bits (e.g., at 714) and before performing channel encoding (e.g., at 718).

Similar to the example of channel bits scrambling, the first UE 702 may use the bit sequence 713 to initialize a scrambling sequence. In some examples, the bit sequence 713 may include a UE ID, such as a layer 1 destination ID. In some examples, the bit sequence 713 may be derived from a UE ID (e.g., part of the UE ID). In some examples, the bit sequence 713 may be based on a UE ID and additional information, such as a slot index, a (pre-) configured parameter, etc. In some examples, the second UE 704 may be associated with multiple destination IDs. In such examples, the second UE 704 may apply each of the multiple destination IDs when descrambling the information bits (e.g., at 746). In some examples, the bit sequence 713 may include a sequence received from a base station. In some examples, the bit sequence 713 may include a sequence negotiated with the first UE 702, e.g., when the first UE 702 and the second UE 704 are configured for sidelink unicast communication and/or sidelink groupcast communication.

As shown in FIG. 7, the first UE 702 transmits the scrambled SCI information 730 that is received by the second UE 704. The second UE 704 may receive the scrambled SCI information 730 and perform one or more descrambling techniques to recover the SCI payload 710. For example, at 746, the second UE 704 may perform information bits descrambling on the scrambled SCI information 730 using the bit sequence 713. As shown in FIG. 7, the second UE 704 may perform the descrambling on the scrambled SCI information 730 after performing the channel decoding (e.g., at 742). Thus, the decoding complexity of the SCI remains the same compared to when the information bits of the SCI are not scrambled.

In some examples, the bit sequence 713 may include a UE ID, such as a layer 1 destination ID. In some examples, the bit sequence 713 may be derived from a UE ID (e.g., part of the UE ID). In some examples, the bit sequence 713 may be based on a UE ID and additional information, such as a slot index, a (pre-) configured parameter, etc. In some examples, the second UE 704 may be associated with multiple destination IDs. In such examples, the second UE 704 may apply each of the multiple destination IDs when descrambling the information bits (e.g., at 746). In some examples, the bit sequence 713 may include a sequence received from a base station. In some examples, the bit sequence 713 may include a sequence negotiated with the first UE 702, e.g., when the first UE 702 and the second UE 704 are configured for sidelink unicast communication and/or sidelink groupcast communication. The second UE 704 may then determine, at 748, if the second UE 704 is the intended target of the sidelink communication.

In some examples, the first UE 702 may scramble, at 712, the information bits of the SCI payload 710. In other examples, the first UE 702 may scramble, at 712, certain fields of the SCI payload 710. For example, the first UE 702 may scramble the information bits of the SCI payload 710 that map to the source identifier information 710a and the destination identifier information 710b while exposing other fields of the SCI payload 710. For example, when the first UE 702 uses a single-stage SCI, the first UE 702 may scramble the information bits of the SCI payload 710 that map to the source identifier information 710a and the destination identifier information 710b and expose the information of the SCI payload 710 that map to the resource reservation information 710c.

Although the example of FIG. 7 is described with performing a scrambling operation (and a descrambling operation) in connection with the CRC bits (e.g., at 714 and 744), in connection with the channel bits (e.g., at 720 and 740), or in connection with the information bits (e.g., at 712 and 746), in other examples, a combination of scrambling operations (and descrambling operations) may be performed. For example, the first UE 702 may scramble the CRC bits (e.g., at 716) and scramble the channel bits (e.g., at 720), and the second UE 704 may descramble the channel bits (e.g., at 740) and descramble the CRC bits (e.g., at 744) to recover the SCI payload 710.

However, to descramble and recover the SCI payload 710, it may be appreciated that the second UE 704 has access to the bit sequence used to scramble the SCI payload 710. For example, to descramble the channel bits (e.g., at 740), the second UE 704 has access to the bit sequence 721. Similarly, to descramble the CRC bits (e.g., at 744), the second UE 704 has access to the bit sequence 717, and to descramble the information bits (e.g., at 746), the second UE 704 has access to the bit sequence 713. Thus, when the second UE 704 is the intended target of the sidelink communication, the second UE 704 is able to decode the SCI payload 710 correctly and obtain the source identifier information 710a and the destination identifier information 710b from the SCI payload 710. In examples in which the second UE 704 is not the intended target of the sidelink communication, but a potential target of a sidelink communication from the first UE 702, the second UE 704 is unable to decode the SCI payload 710 correctly and, thus skips receiving the sidelink communication (e.g., the transport block and/or the PSSCH). In examples in which the second UE 704 is a malicious UE, the second UE 704 is unaware of the bit sequence used to scramble the SCI payload 710 and, thus, unable to decode the SCI payload 710 correctly.

In some examples, the second UE 704 may not be configured to perform one or more descrambling operations. In such examples, if the second UE 704 receives the scrambled SCI information 730 and is not the intended target of the sidelink communication, then the second UE 704 may skip further processing of the sidelink communication. However, when the second UE 704 is the intended target is in unable to perform the descrambling operations disclosed herein, the first UE 702 may skip performing scrambling operations on the SCI payload 710 and instead transmit SCI that is not scrambled based on the scrambling operations described in connection with 712, 716, and 720 disclosed herein. Instead, the first UE 702 may transmit SCI in accordance with the scrambled message 628 of FIG. 6A, the first-stage SCI 642, and/or the second-stage SCI 652 of FIG. 6B.

In some examples, the first UE 702 may determine the ability of the second UE 704 to perform the descrambling operations disclosed herein (e.g., in connection with 740, 744, and/or 746) based on capability information of the second UE 704. For example, when the first UE 702 and the second UE 704 are configured for sidelink unicast communication and/or sidelink groupcast communication, the second UE 704 may provide capability information to the first UE 702 indicating an ability to perform one or more of the descrambling operations. In such examples, the first UE 702 may perform one or more of the scrambling operations disclosed herein (e.g., in connection with 712, 716, and/or 720) based on the capability information of the second UE 704.

In some examples, the first UE 702 may determine the ability of the first UE 702 to perform the descrambling operations disclosed herein (e.g., in connection with 740, 744, and/or 746) based on an application identifier and/or a destination ID. For example, the second UE 704 may be assigned an application ID and/or a destination ID that indicates an ability to perform one or more of the disclosed descrambling techniques. In such examples, the first UE 702 may perform one or more of the scrambling operations disclosed herein (e.g., in connection with 712, 716, and/or 720) based on the application ID and/or the destination ID associated with the second UE 704.

Figure 8B:
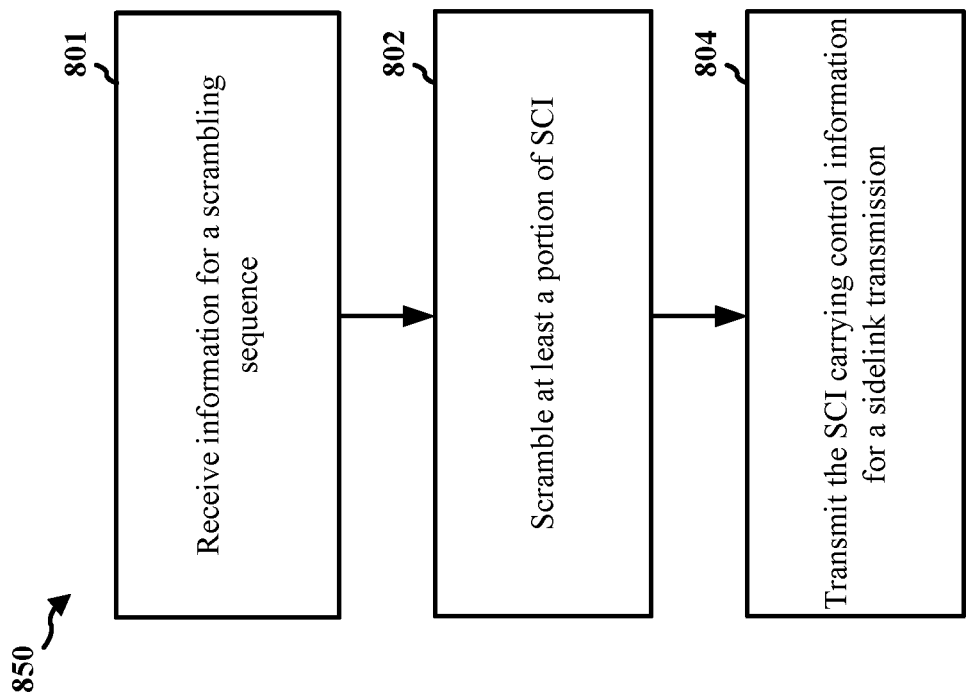
FIG. 8B is a flowchart of a method of wireless communication at a UE, in accordance with the teachings disclosed herein.
Figure 8A:
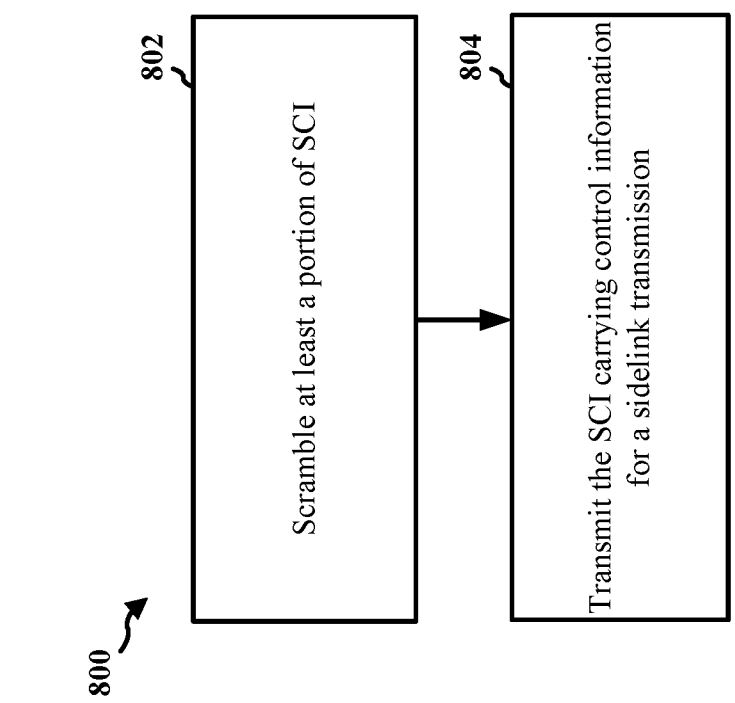
FIG. 8A is a flowchart of a method of wireless communication at a UE, in accordance with the teachings disclosed herein.

FIG. 8A is a flowchart 800 of a method of wireless communication. The method may be performed by a UE (e.g., the UE 104; the device 310 or 350; the apparatus 902). The method may help to provide security for the SCI and/or the corresponding PSSCH by enabled intended receivers to decode the SCI and limiting unintended receivers from decoding the SCI and obtaining information about the corresponding PSSCH.

At 802, the UE scrambles at least a portion of SCI. In some aspects, the portion of the SCI may include a portion of a second stage SCI, e.g., SCI-2. In some aspects, the SCI may be a single stage SCI, and the portion may be a portion of the single stage SCI. In some aspects, the UE may scramble at least the portion of the SCI based on communication with an intended receiver that supports reception of scrambled SCI. In some aspects, the UE may scramble at least the portion of an SCI-2 that is transmitted in a PSSCH. For example, the UE may scramble CRC bits of the SCI-2 based on a UE identifier (ID). The UE ID may be at least one of a source ID or a destination ID, e.g., an L1 source ID, an L1 destination ID, an L2 source ID, an L2 destination ID, and/or a source ID and destination ID. In some aspects, the UE may scramble channel bits of the SCI-2 based on a sequence that is initialized based on a UE identifier (ID). The term "channel bits" may refer to bits of the SCI after rate matching is performed, e.g., after channel encoding is performed for the SCI transmission. In some aspects, the UE may perform channel encoding and then scramble bits of the encoded channel. In some aspects, the UE may scramble information bits of the SCI-2 based on a sequence that is initialized based on a UE identifier (ID). "Information bits" may refer to a payload of the SCI, e.g., prior to adding CRC bits and prior to channel encoding. For example, the information bits in the SCI-2 referring to the payload of the SCI-2. After scrambling the information bits and/or the CRC bits, the UE may perform channel encoding of the SCI bits, rate matching and/or modulating the bits.

In some aspects, the UE may scramble bits in one or more field of the SCI-2 based on one or more of a UE identifier (ID) or a received parameter. In some aspects, the SCI may include a single stage SCI, e.g., rather than SCI-1 and SCI-2, in which one or more fields includes scrambled bits and at least one field has unscrambled bits. The scrambling may be performed, e.g., by the scramble component 940 of the apparatus 902 in FIG. 9. The scrambling of the portion of the SCI may help to provide security for the SCI and/or the corresponding PSSCH by enabled intended receivers to decode the SCI and limiting unintended receivers from decoding the SCI and obtaining information about the corresponding PSSCH.

At 804, the UE transmits the SCI carrying control information for a sidelink transmission. In some aspects, the SCI may include SCI-2 that is transmitted in a PSSCH. In some aspects, the SCI may include a single stage SCI. In some aspects, the SCI may be transmitted in a PSCCH. The transmission may be performed, e.g., by the SCI component 942 and/or the transmission component 934 of the apparatus 902 in FIG. 9.

FIG. 8B illustrates a flowchart showing a method of wireless communication 850 at a UE that may include the scrambling of at least a portion of SCI, as described in connection with 802, and transmission of the SCI carrying control information for a sidelink transmission, as described in connection with 904.

At illustrated at 801, in some aspects the UE may further receive information for a scrambling sequence. In some aspects, the information may include a scrambling sequence configuration from a base station. In some aspects, the information may be received in a sidelink message from another UE. Then, at, 804, the UE may scramble at least one of the CRC bits of the SCI-2, the channel bits of the SCI-2, or the information bits of the SCI-2 based on the scrambling sequence. The reception may be performed, e.g., by the information component 944 and/or the reception component 930 of the apparatus 902 in FIG. 9.

Figure 9:
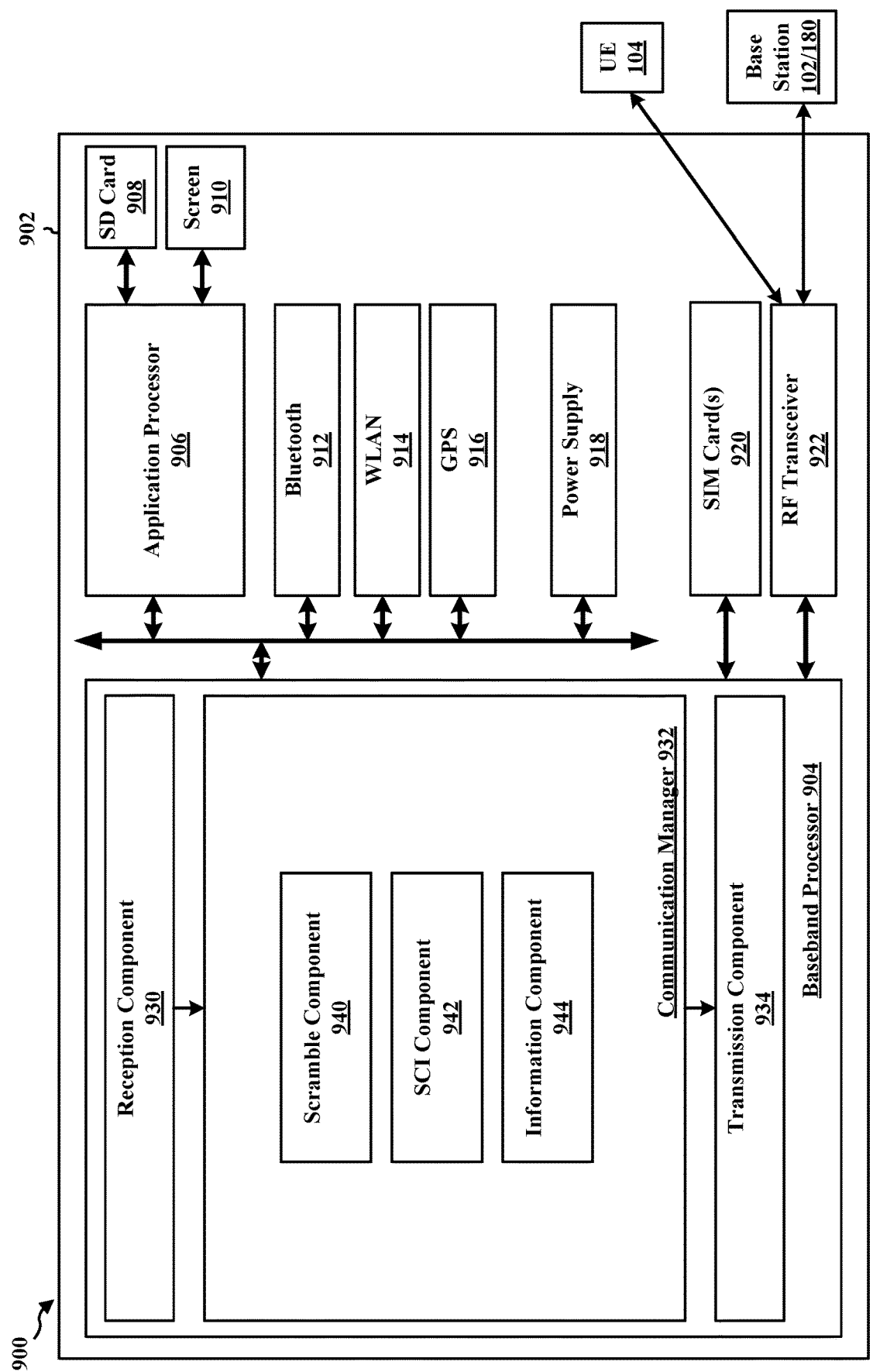
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 may be a UE, a component of a UE, or may implement UE functionality. In some aspects, the apparatus 902 may be another device configured to transmit and/or receive sidelink communication. As an example, in some aspects, the apparatus 902 may be an RSU. The apparatus 902 includes a baseband processor 904 (also referred to as a modem) coupled to a RF transceiver 922. In some aspects, the baseband processor 904 may be a cellular baseband processor and/or the RF transceiver 922 may be a cellular RF transceiver. The apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The baseband processor 904 communicates through the RF transceiver 922 with the UE 104 and/or BS 102/180. The baseband processor 904 may include a computer-readable medium/memory. The computer-readable medium/memory may be non-transitory. The baseband processor 904 is responsible for general processing, including the execution of software stored on the computer-readable medium/memory. The software, when executed by the baseband processor 904, causes the baseband processor 904 to perform the various functions described in the present application. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the device 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a scramble component 940 that is configured to scramble at least a portion of SCI, e.g., as described in connection with 802 in FIG. 8A or 8B. The communication manager 932 further includes an SCI component 942 that is configured to transmit the SCI carrying control information for a sidelink transmission, e.g., as described in connection with 804 in FIG. 8A or 8B. The communication manager 932 further includes an information component 944 that is configured to receive information for a scrambling sequence, e.g., as described in connection with 801 in FIG. 8B.

The apparatus may include additional components that perform each of the blocks of the algorithm in the flowcharts of FIGS. 8A and 8B. As such, each block in the flowcharts of FIGS. 8A and 8B may be performed by a component and the apparatus may include one or more of those components.

The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband processor 904, includes means for scrambling at least a portion of SCI and means for transmitting the SCI carrying control information for a sidelink transmission. The apparatus 902 may further include means for receiving information for a scrambling sequence. The means may be one or more of the components of the apparatus 902 configured to perform the functions recited by the means. As described herein, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10B:
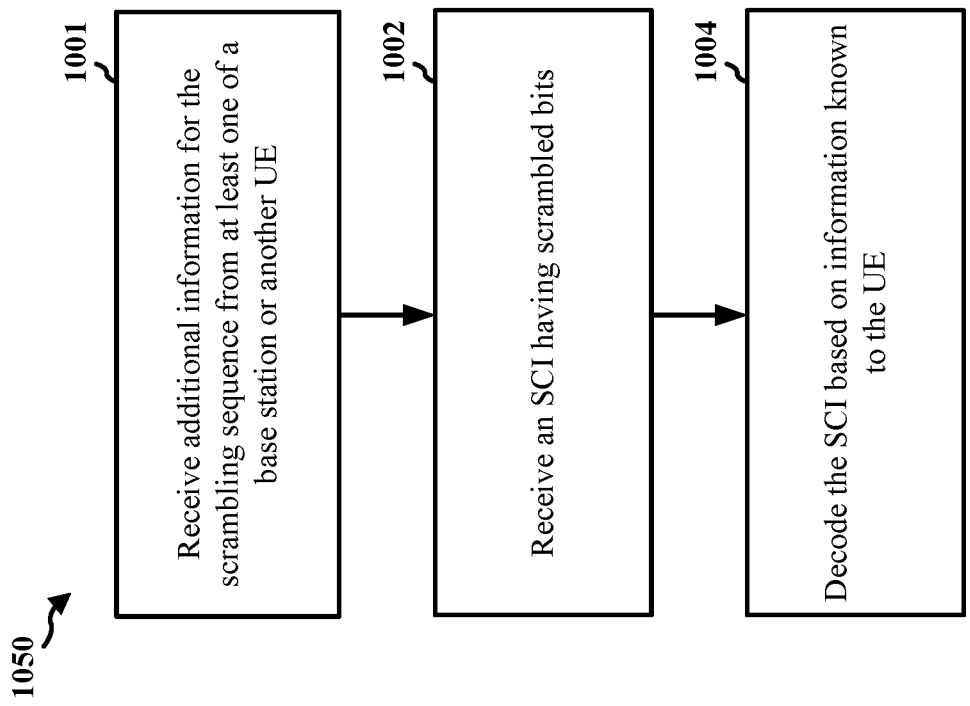
FIG. 10B is a flowchart of a method of wireless communication at a UE, in accordance with the teachings disclosed herein.
Figure 10A:
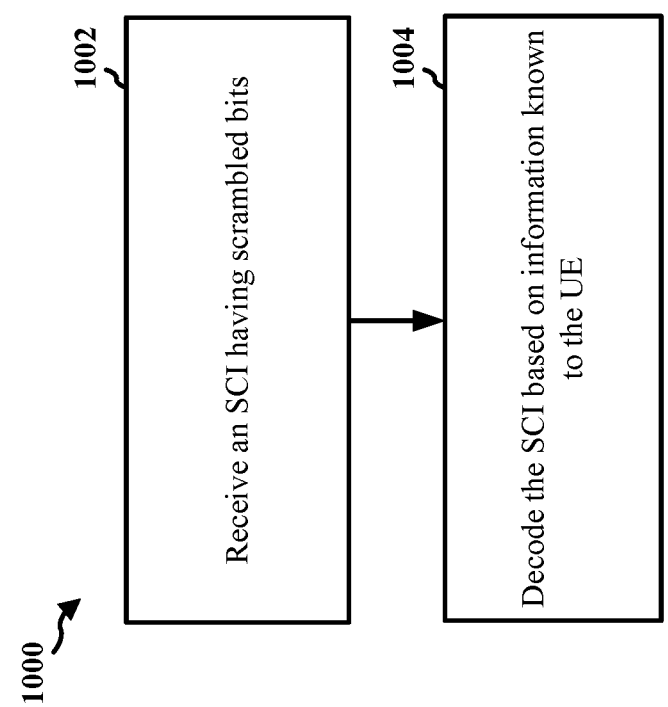
FIG. 10A is a flowchart of a method of wireless communication at a UE, in accordance with the teachings disclosed herein.

FIG. 10A is a flowchart 1000 of a method of wireless communication. The method may be performed by a UE (e.g., the UE 104; the device 310 or 350; the apparatus 1102). The method may allow for security for the SCI and/or the corresponding PSSCH by enabled intended receivers to decode the SCI and limiting unintended receivers from decoding the SCI and obtaining information about the corresponding PSSCH.

At 1002, the UE receives a SCI having scrambled bits. The scrambled bits may include at least one of CRC bits of SCI-2, channel bits of the SCI-2, or information bits of the SCI-2 based on a UE ID known to the UE. The term "channel bits" may refer to bits of the SCI after rate matching is performed, e.g., after channel encoding is performed for the SCI transmission. "Information bits" may refer to a payload of the SCI, e.g., prior to adding CRC bits and prior to channel encoding. For example, the UE ID may be at least one of a source ID or a destination ID. The UE ID may be at least one of a source ID or a destination ID, e.g., an L1 source ID, an L1 destination ID, an L2 source ID, an L2 destination ID, and/or a source ID and destination ID. In some aspects, the scrambled bits may be scrambled based on a sequence that is initialized based on a UE ID. The scrambled bits may include at least one of CRC bits of SCI-2, channel bits of the SCI-2, or information bits of the SCI-2 based on a scrambling sequence known to the UE. In some aspects, the scrambled bits may include one or more fields of the SCI. In some aspects, the SCI may be a single stage SCI having at least one field with unscrambled bits. The SCI may include an SCI-2 that is received in a PSSCH. The SCI may include a single stage SCI. In some aspects, the SCI may be received in a PSCCH. The reception may be performed, e.g., by the SCI component 1142 and/or the reception component 1130 of the apparatus 1102 in FIG. 11.

At 1004, the UE decodes the SCI based on information known to the UE. For example, if the UE is an intended receiver, the UE may perform de-scrambling to decode the SCI correctly. For a UE that is not an intended receiver, e.g., which may be indicated by the destination ID, the UE may not be able to decode the SCI, and will skip receiving the corresponding transmission, e.g., the corresponding PSSCH or data. For a UE that is attempting to receive communication for which it is not an intended receiver, the scrambling of the portion of the SCI may prevent the UE from decoding the SCI and corresponding PSSCH for which it is not an intended receiver. The decoding may be performed, e.g., by the decode component 1140 of the apparatus 1102 in FIG. 11.

FIG. 10B illustrates a flowchart showing a method of wireless communication 1050 at a UE that may include the reception of the SCI having scrambled bits, as described in connection with 1002, and decoding of the SCI based on information known to the UE, as described in connection with 1004.

At illustrated at 1001, in some aspects the UE may further receive additional information for the scrambling sequence from at least one of a base station or another UE. The reception may be performed, e.g., by the information component 1144 and/or the reception component 1130 of the apparatus 1102 in FIG. 11.

Figure 11:
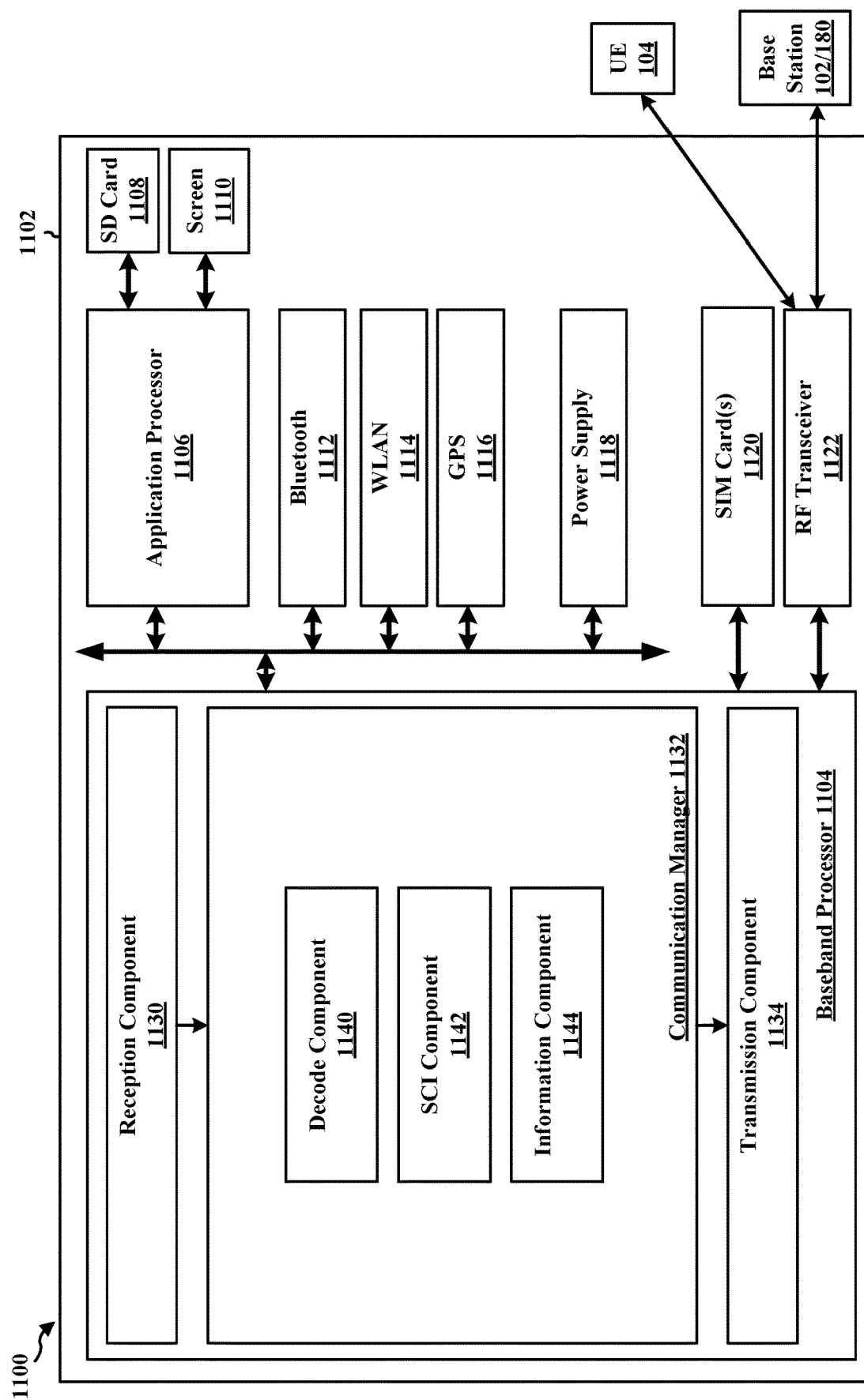
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may be another device configured to transmit and/or receive sidelink communication. As an example, in some aspects, the apparatus 1102 may be an RSU. The apparatus 1102 includes a baseband processor 1104 (also referred to as a modem) coupled to a RF transceiver 1122. In some aspects, the baseband processor 1104 may be a cellular baseband processor and/or the RF transceiver 1122 may be a cellular RF transceiver. The apparatus 1102 may further include one or more SIM cards 1120, an application processor 1106 coupled to a SD card 1108 and a screen 1110, a Bluetooth module 1112, a WLAN module 1114, a GPS module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described in the present application. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an SCI component 1142 that is configured to an SCI having scrambled bits, e.g., as described in connection with 1002 in FIG. 10A or 10B. The communication manager 1132 further includes a decode component 1140 that is configured to decode the SCI based on information known to the UE, e.g., as described in connection with 1004 in FIG. 10A or 10B. The communication manager 1132 further includes an information component 1144 that is configured to receive additional information for the scrambling sequence from at least one of a base station or another UE, e.g., as described in connection with 1001 in FIG. 10B.

The apparatus may include additional components that perform each of the blocks of the algorithm in the flowcharts of FIGS. 10A and 10B. As such, each block in the flowcharts of FIGS. 10A and 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for receiving an SCI having scrambled bits and means for decoding the SCI based on information known to the UE. The apparatus may include means for receiving additional information for the scrambling sequence from at least one of a base station or another UE. The means may be one or more of the components of the apparatus 1102 configured to perform the functions recited by the means. As described herein, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: scramble at least a portion of SCI; and transmit the SCI carrying control information for a sidelink transmission.

Aspect 2 is the apparatus of aspect 1, further including that at least one of an antenna or a transceiver coupled to the at least one processor, wherein to scramble at least the portion of the SCI, the at least one processor is configured to: scramble at least the portion of an SCI-2 that is transmitted in a PSSCH.

Aspect 3 is the apparatus of any of aspects 1 and 2, further including that to scramble at least the portion of the SCI-2, the at least one processor is configured to: scramble CRC bits of the SCI-2 based on a UE ID.

Aspect 4 is the apparatus of any of aspects 1 to 3, further including that the UE ID is at least one of a source ID or a destination ID.

Aspect 5 is the apparatus of any of aspects 1 to 4, further including that to scramble at least the portion of the SCI-2, the at least one processor is configured to: scramble channel bits of the SCI-2 based on a sequence that is initialized based on a UE ID.

Aspect 6 is the apparatus of any of aspects 1 to 5, further including that to scramble at least the portion of the SCI-2, the at least one processor is configured to: scramble information bits of the SCI-2 based on a sequence that is initialized based on a UE ID.

Aspect 7 is the apparatus of any of aspects 1 to 6, further including that to scramble at least the portion of the SCI-2, the at least one processor is configured to: receive information for a scrambling sequence; and scramble at least one of CRC bits of the SCI-2, channel bits of the SCI-2, or information bits of the SCI-2 based on the scrambling sequence.

Aspect 8 is the apparatus of any of aspects 1 to 7, further including that the information includes a scrambling sequence configuration from a base station.

Aspect 9 is the apparatus of any of aspects 1 to 7, further including that the information is received in a sidelink message from another UE.

Aspect 10 is the apparatus of any of aspects 1 to 9, further including that to scramble at least the portion of the SCI-2, the at least one processor is configured to: scramble bits in one or more field of the SCI-2 based on one or more of a UE ID or a received parameter.

Aspect 11 is the apparatus of any of aspects 1 to 10, further including that the SCI includes a single stage SCI in which one or more fields includes scrambled bits and at least one field has unscrambled bits.

Aspect 12 is the apparatus of any of aspects 1 to 11, further including that to scramble at least the portion of the SCI, the at least one processor is configured to: scramble at least the portion of the SCI based on communication with an intended receiver that supports reception of scrambled SCI.

Aspect 13 is a method of wireless communication for implementing any of aspects 1 to 12.

Aspect 14 is an apparatus for wireless communication including means for implementing any of aspects 1 to 12.

Aspect 15 is a non-transitory computer-readable storage medium storing computer executable code, where the code, when executed, causes a processor to implement any of aspects 1 to 12.

Aspect 16 is an apparatus for wireless communication at a UE including at least one processor coupled to a memory and configured to: receive SCI having scrambled bits; and decode the SCI based on information known to the UE.

Aspect 17 is the apparatus of aspect 16, further including that the scrambled bits include at least one of: CRC bits of SCI-2 scrambled based on a UE ID known to the UE, channel bits of the SCI-2 scrambled based on the UE ID known to the UE, information bits of the SCI-2 scrambled based on the UE ID known to the UE, the CRC bits of SCI-2 scrambled based on a scrambling sequence known to the UE, the channel bits of the SCI-2 scrambled based on the scrambling sequence known to the UE, or the information bits of the SCI-2 scrambled based on the scrambling sequence known to the UE.

Aspect 18 is the apparatus of any of aspects 16 and 17, further including that the at least one processor is further configured to: receive additional information for a scrambling sequence from at least one of a base station or another UE.

Aspect 19 is the apparatus of any of aspects 16 to 18, further including that the scrambled bits include one or more fields of the SCI.

Aspect 20 is the apparatus of any of aspects 16, and 18 to 19, further including that the SCI is a single stage SCI having at least one field with unscrambled bits.

Aspect 21 is a method of wireless communication for implementing any of aspects 16 to 20.

Aspect 22 is an apparatus for wireless communication including means for implementing any of aspects 16 to 20.

Aspect 23 is a non-transitory computer-readable storage medium storing computer executable code, where the code, when executed, causes a processor to implement any of aspects 16 to 20.

What is claimed is:

1. A method of wireless communication at a user equipment (UE), comprising:
   exchanging, with a second UE, a sequence for scrambling a portion of sidelink control information (SCI) based on a combination of UE identifier (ID) and a slot index for a time domain;
   scrambling at least the portion of the SCI based on the sequence that is initialized based on the combination of the UE ID and the slot index for the time domain, the sequence being different from the UE identifier, the portion including one or more channel bits of the SCI, wherein the sequence is based on $(x_1(n+N_c)+x_2(n+N_c))\bmod 2$, wherein $x_1$ represents a first m-sequence, $x_2$ represents a second m-sequence, $N_c$ represents a defined seed, and n represents a parameter, and wherein the sequence is based on the combination of the UE ID and the slot index; and
   transmitting the SCI carrying control information for a sidelink transmission.

2. The method of claim 1, wherein scrambling at least the portion of the SCI includes:
   scrambling at least the portion of an SCI-2 that is transmitted in a physical sidelink shared channel (PSSCH).

3. The method of claim 2, wherein scrambling at least the portion of the SCI-2 includes:
   scrambling cyclic redundancy check (CRC) bits of the SCI-2.

4. The method of claim 3, wherein the UE ID is at least one of a source ID or a destination ID.

5. The method of claim 2, wherein scrambling at least the portion of the SCI-2 includes:
   scrambling the one or more channel bits of the SCI-2 based on the sequence.

6. The method of claim 2, wherein scrambling at least the portion of the SCI-2 includes:
   scrambling information bits of the SCI-2 based on the sequence.

7. The method of claim 2, wherein scrambling at least the portion of the SCI-2 includes:
   receiving information for the sequence;
   generating the sequence based on the information for the sequence;
   exchanging the sequence with the second UE after generation of the sequence; and
   scrambling at least one of cyclic redundancy check (CRC) bits of the SCI-2, channel bits of the SCI-2, or information bits of the SCI-2 based on the sequence.

8. The method of claim 7, wherein the information includes a scrambling sequence configuration configured by a base station, wherein the scrambling sequence configuration comprises a preconfigured parameter associated with the combination.

9. The method of claim 7, wherein the information is included in a sidelink message from another UE.

10. The method of claim 2, wherein the sequence is based on the combination of the UE ID, the slot index, and a preconfigured parameter.

11. The method of claim 1, wherein the SCI includes a single stage SCI in which one or more fields includes scrambled bits and at least one field has unscrambled bits.

12. The method of claim 1, wherein scrambling at least the portion of the SCI includes:
   scrambling at least the portion of the SCI based on communication with an intended receiver that supports reception of scrambled SCI.

13. An apparatus for wireless communication at a user equipment (UE), comprising:
   memory; and
   at least one processor coupled to the memory and configured to:
      exchange, with a second UE, a sequence for scrambling a portion of sidelink control information (SCI) based on a combination of UE identifier (ID) and a slot index for a time domain;
      scramble at least the portion of the SCI based on the sequence that is initialized based on the combination of the UE ID and the slot index for the time domain, the sequence being different from the UE identifier, the portion including one or more channel bits of the SCI, wherein the sequence is based on $(x_1(n+N_c)+x_2(n+N_c))$ mod2, wherein $x_1$ represents a first m-sequence, $x_2$ represents a second m-sequence, $N_c$ represents a defined seed, and n represents a parameter, and wherein the sequence is based on the combination of the UE ID and the slot index; and transmit the SCI carrying control information for a sidelink transmission.

14. The apparatus of claim 13, further comprising:
at least one of an antenna or a transceiver coupled to the at least one processor, wherein to scramble at least the portion of the SCI, the at least one processor is configured to:
scramble at least the portion of an SCI-2 that is transmitted in a physical sidelink shared channel (PSSCH).

15. The apparatus of claim 14, wherein to scramble at least the portion of the SCI-2, the at least one processor is configured to:
scramble cyclic redundancy check (CRC) bits of the SCI-2 based on the sequence, wherein the UE ID is at least one of a source ID or a destination ID.

16. The apparatus of claim 14, wherein to scramble at least the portion of the SCI-2, the at least one processor is configured to:
scramble the one or more channel bits of the SCI-2 based on the sequence.

17. The apparatus of claim 14, wherein to scramble at least the portion of the SCI-2, the at least one processor is configured to:
scramble information bits of the SCI-2 based on based on the sequence.

18. The apparatus of claim 14, wherein to scramble at least the portion of the SCI-2, the at least one processor is configured to:
receive information for the sequence;
generate the sequence based on the information for the sequence;
exchange the sequence with the second UE after generation of the sequence; and
scramble at least one of cyclic redundancy check (CRC) bits of the SCI-2, channel bits of the SCI-2, or information bits of the SCI-2 based on the sequence.

19. The apparatus of claim 18, wherein the information includes a scrambling sequence configuration configured by a base station or in a sidelink message from another UE, wherein the scrambling sequence configuration comprises a preconfigured parameter associated with the combination.

20. The apparatus of claim 14, wherein the sequence is based on the combination of the UE ID, the slot index, and a preconfigured parameter.

21. The apparatus of claim 13, wherein the SCI includes a single stage SCI in which one or more fields includes scrambled bits and at least one field has unscrambled bits.

22. The apparatus of claim 13, wherein to scramble at least the portion of the SCI, the at least one processor is configured to:
scramble at least the portion of the SCI based on communication with an intended receiver that supports reception of scrambled SCI.

23. An apparatus for wireless communication at a user equipment (UE), comprising:

memory; and
at least one processor coupled to the memory and configured to:
exchange, with a second UE, a sequence for scrambling sidelink control information (SCI) based on a combination of UE identifier (ID) and a slot index for a time domain;
receive the SCI having scrambled bits scrambled based on the sequence that is initialized based on the combination of the UE ID and the slot index for the time domain, the sequence being different from the UE identifier, the scrambled bits including one or more channel bits of the SCI, wherein the sequence is based on $(x_1(n+N_c)+x_2(n+N_c))$ mod2, wherein $x_1$ represents a first m-sequence, $x_2$ represents a second m-sequence, $N_c$ represents a defined seed, and n represents a parameter, and wherein the sequence is based on the combination of the UE ID and the slot index; and
decode the SCI based on information known to the UE.

24. The apparatus of claim 23, wherein the sequence or the UE ID is known to the UE, and wherein the scrambled bits include at least one of:
cyclic redundancy check (CRC) bits of SCI-2,
channel bits of the SCI-2,
information bits of the SCI-2,
the channel bits of the SCI-2, or
the information bits of the SCI-2.

25. The apparatus of claim 23, wherein the at least one processor is further configured to:
receive additional information for the sequence from at least one of a base station or another UE.

26. The apparatus of claim 23, wherein the scrambled bits include one or more fields of the SCI.

27. The apparatus of claim 23, wherein the SCI is a single stage SCI having at least one field with unscrambled bits.

28. A method of wireless communication at a user equipment (UE), comprising:
exchanging, with a second UE, a sequence for scrambling sidelink control information (SCI) based on a combination of UE identifier (ID) and a slot index for a time domain;
receiving the SCI having scrambled bits scrambled based on the sequence that is initialized based on the combination of the UE ID and the slot index for the time domain, the sequence being different from the UE identifier, the scrambled bits including one or more channel bits of the SCI, wherein the sequence is based on $(x_1(n+N_c)+x_2(n+N_c))$ mod2, wherein $x_1$ represents a first m-sequence, $x_2$ represents a second m-sequence, $N_c$ represents a defined seed, and n represents a parameter, and wherein the sequence is based on the combination of the UE ID and the slot index; and
decoding the SCI based on information known to the UE.

29. The method of claim 28, wherein the sequence or the UE ID is known to the UE, and wherein the scrambled bits include at least one of:
cyclic redundancy check (CRC) bits of SCI-2,
channel bits of the SCI-2,
information bits of the SCI-2,
the channel bits of the SCI-2, or
the information bits of the SCI-2.

30. The method of claim 28, further comprising:
receiving additional information for the sequence from at least one of a base station or another UE.

* * * * *